(12) United States Patent
Begun et al.

(10) Patent No.: US 7,281,018 B1
(45) Date of Patent: Oct. 9, 2007

(54) FORM TEMPLATE DATA SOURCE CHANGE

(75) Inventors: Andrew Paul Begun, Redmond, WA (US); Laurent Mollicone, Kirkland, WA (US); Alessandro Catorcini, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 338 days.

(21) Appl. No.: 10/854,961

(22) Filed: May 26, 2004

(51) Int. Cl.
*G06F 17/30* (2006.01)

(52) U.S. Cl. .................... 707/102; 707/101; 707/104.1

(58) Field of Classification Search .............. 707/1–10, 707/100–104.1
See application file for complete search history.

(56) References Cited

U.S. PATENT DOCUMENTS

| | | | |
|---|---|---|---|
| 4,498,147 A | 2/1985 | Agnew et al. |
| 4,514,800 A | 4/1985 | Gruner et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendal et al. |
| 4,962,475 A | 10/1990 | Hernandez et al. |
| 5,072,412 A | 12/1991 | Henderson, Jr. et al. |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |

(Continued)

FOREIGN PATENT DOCUMENTS

EP 0841615 11/1999

(Continued)

OTHER PUBLICATIONS

U.S. Appl. No. 60/209,713, Kutay et al.

(Continued)

*Primary Examiner*—Mohammad Ali

(57) ABSTRACT

A first data source has a plurality of nodes each corresponding to a respective piece of a form template. Each piece of the form template has one of more dependencies to the correspond node of the first data source. Dependencies can be bindings or validation of data. A second data source has a plurality of nodes. Differences are found between the first and second data sources by comparing each node in the first data source with a corresponding node in the second data source. The differences can be as to type, cardinality, name, or a movement, removal or addition of a node. The differences are used to update the dependencies of each piece of the form template to each node of the first data source. Each of the first and second data sources can be a document expressed in a markup language or in a web service definition language.

37 Claims, 12 Drawing Sheets

U.S. PATENT DOCUMENTS

| | | |
|---|---|---|
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,982,370 A | 11/1999 | Kamper |
| 5,987,480 A | 11/1999 | Donohue et al. |
| 5,991,710 A | 11/1999 | Papineni et al. |
| 5,995,103 A | 11/1999 | Ashe |
| 5,999,740 A | 12/1999 | Rowley |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,275,227 B1 | 8/2001 | DeStefano |

| | | |
|---|---|---|
| 6,275,599 B1 | 8/2001 | Adler et al. |
| 6,281,896 B1 | 8/2001 | Alimpich et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,300,948 B1 | 10/2001 | Geller et al. |
| 6,308,179 B1 | 10/2001 | Petersen et al. |
| 6,311,271 B1 | 10/2001 | Gennaro et al. |
| 6,321,334 B1 | 11/2001 | Jerger et al. |
| 6,327,628 B1 | 12/2001 | Anuff et al. |
| 6,342,907 B1 | 1/2002 | Petty et al. |
| 6,343,302 B1 | 1/2002 | Graham |
| 6,345,256 B1 | 2/2002 | Milsted et al. |
| 6,345,361 B1 | 2/2002 | Jerger et al. |
| 6,347,323 B1 | 2/2002 | Garber et al. |
| 6,349,408 B1 | 2/2002 | Smith |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,396,488 B1 | 5/2002 | Simmons et al. |
| 6,408,311 B1 | 6/2002 | Baisley et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,434,563 B1 | 8/2002 | Pasquali et al. |
| 6,434,564 B2 | 8/2002 | Ebert |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,702 B1 | 12/2002 | Adar et al. |
| 6,502,101 B1 | 12/2002 | Verprauskus et al. |
| 6,502,103 B1 | 12/2002 | Frey et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| RE38,070 E | 4/2003 | Spies et al. |
| 6,546,546 B1 | 4/2003 | Van Doorn et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,668,369 B1 | 12/2003 | Krebs et al. |
| 6,675,202 B1 | 1/2004 | Perttunen |
| 6,678,717 B1 | 1/2004 | Schneider |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,735,721 B1 | 5/2004 | Morrow et al. |
| 6,748,385 B1 | 6/2004 | Rodkin et al. |
| 6,751,777 B2 | 6/2004 | Bates et al. |
| 6,754,874 B1 | 6/2004 | Richman |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,799,299 B1 * | 9/2004 | Li et al. ..................... 715/513 |
| 6,801,929 B1 | 10/2004 | Donoho et al. |
| 6,816,849 B1 | 11/2004 | Halt, Jr. |
| 6,845,380 B2 | 1/2005 | Su et al. |
| 6,845,499 B2 | 1/2005 | Srivastava et al. |
| 6,848,078 B1 | 1/2005 | Birsan et al. |
| 6,871,220 B1 | 3/2005 | Rajan et al. |
| 6,874,130 B1 | 3/2005 | Baweja et al. |
| 6,876,996 B2 | 4/2005 | Czajkowski et al. |
| 6,901,403 B1 | 5/2005 | Bata et al. |
| 6,915,454 B1 | 7/2005 | Moore et al. |
| 6,931,532 B1 | 8/2005 | Davis et al. |
| 6,941,511 B1 | 9/2005 | Hind et al. |
| 6,941,521 B2 | 9/2005 | Lin et al. |
| 6,948,133 B2 | 9/2005 | Haley |
| 6,950,980 B1 | 9/2005 | Malcolm |
| 6,961,897 B1 | 11/2005 | Peel, Jr. et al. |
| 6,963,875 B2 | 11/2005 | Moore et al. |
| 6,968,505 B1 | 11/2005 | Stoll et al. |
| 6,993,714 B2 | 1/2006 | Kaler et al. |
| 6,996,781 B1 | 2/2006 | Myers et al. |
| 7,003,722 B2 | 2/2006 | Rothchiller et al. |
| 7,024,417 B1 | 4/2006 | Russakovsky et al. |
| 7,032,170 B2 | 4/2006 | Poulose |
| 7,051,273 B1 | 5/2006 | Holt et al. |
| 7,065,493 B1 | 6/2006 | Homsi |
| 7,080,325 B2 | 7/2006 | Treibach-Heck et al. |

| | | |
|---|---|---|
| 7,088,374 B2 | 8/2006 | David et al. |
| 7,103,611 B2 | 9/2006 | Murthy et al. |
| 7,106,888 B1 | 9/2006 | Silverbrook et al. |
| 7,152,205 B2 | 12/2006 | Day et al. |
| 7,191,394 B1 | 3/2007 | Ardeleanu et al. |
| 2001/0007109 A1 | 7/2001 | Lange |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0056429 A1 | 12/2001 | Moore et al. |
| 2001/0056460 A1 | 12/2001 | Sahota et al. |
| 2002/0010743 A1 | 1/2002 | Ryan et al. |
| 2002/0013788 A1 | 1/2002 | Pennell et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032706 A1 | 3/2002 | Perla et al. |
| 2002/0032768 A1 | 3/2002 | Voskuil |
| 2002/0040469 A1 | 4/2002 | Pramberger |
| 2002/0057297 A1 | 5/2002 | Grimes et al. |
| 2002/0078074 A1 | 6/2002 | Cho et al. |
| 2002/0078103 A1 | 6/2002 | Gorman et al. |
| 2002/0100027 A1 | 7/2002 | Binding et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169789 A1 | 11/2002 | Kutay et al. |
| 2002/0174147 A1 | 11/2002 | Wang et al. |
| 2002/0184219 A1 | 12/2002 | Preisig et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0007000 A1 | 1/2003 | Carlson et al. |
| 2003/0014397 A1 | 1/2003 | Chau et al. |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0037303 A1 | 2/2003 | Bodlaender et al. |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0056198 A1 | 3/2003 | Al-Azzawe et al. |
| 2003/0061386 A1 | 3/2003 | Brown |
| 2003/0061567 A1 | 3/2003 | Brown et al. |
| 2003/0120651 A1 | 6/2003 | Bernstein et al. |
| 2003/0120659 A1 | 6/2003 | Anandampillai |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0158897 A1 | 8/2003 | Ben-Natan et al. |
| 2003/0167277 A1 | 9/2003 | Hejlsberg et al. |
| 2003/0182268 A1 | 9/2003 | Lal |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0204511 A1 | 10/2003 | Brundage |
| 2003/0204814 A1 | 10/2003 | Elo et al. |
| 2003/0205615 A1 | 11/2003 | Marappan |
| 2003/0225469 A1 | 12/2003 | DeRemer et al. |
| 2003/0225768 A1 | 12/2003 | Chaudhuri |
| 2003/0225829 A1 | 12/2003 | Pena et al. |
| 2003/0226132 A1 | 12/2003 | Tondreau et al. |
| 2003/0233374 A1 | 12/2003 | Spinola et al. |
| 2003/0236859 A1 | 12/2003 | Vaschillo et al. |
| 2003/0237046 A1* | 12/2003 | Parker et al. ............... 715/513 |
| 2003/0237047 A1 | 12/2003 | Borson |
| 2004/0002939 A1 | 1/2004 | Arora |
| 2004/0003353 A1 | 1/2004 | Rivera et al. |
| 2004/0003389 A1 | 1/2004 | Reynar et al. |
| 2004/0030991 A1 | 2/2004 | Hepworth et al. |
| 2004/0039990 A1 | 2/2004 | Bakar et al. |
| 2004/0044965 A1 | 3/2004 | Toyama et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0107367 A1 | 6/2004 | Kisters |
| 2004/0117769 A1 | 6/2004 | Lauzon et al. |
| 2004/0146199 A1 | 7/2004 | Berkner et al. |
| 2004/0172442 A1 | 9/2004 | Ripley |
| 2004/0186762 A1 | 9/2004 | Beaven et al. |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler |
| 2004/0205605 A1 | 10/2004 | Adler et al. |
| 2004/0205671 A1 | 10/2004 | Sukehiro et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0268229 A1 | 12/2004 | Paoli et al. |
| 2005/0027757 A1 | 2/2005 | Kiessig et al. |
| 2005/0055627 A1 | 3/2005 | Lloyd et al. |
| 2005/0060324 A1 | 3/2005 | Johnson et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0091305 A1 | 4/2005 | Lange et al. |
| 2005/0102370 A1 | 5/2005 | Lin et al. |
| 2005/0108624 A1 | 5/2005 | Carrier |
| 2005/0114757 A1 | 5/2005 | Sahota et al. |
| 2005/0171746 A1 | 8/2005 | Thalhammer-Reyero |
| 2005/0198086 A1 | 9/2005 | Moore |
| 2005/0198247 A1 | 9/2005 | Perry et al. |
| 2005/0223063 A1 | 10/2005 | Chang et al. |
| 2005/0223320 A1 | 10/2005 | Brintzenhofe et al. |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059434 A1 | 3/2006 | Boss et al. |
| 2006/0069605 A1 | 3/2006 | Hatoun |
| 2006/0085409 A1 | 4/2006 | Rys et al. |
| 2006/0143220 A1 | 6/2006 | Spencer |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |

FOREIGN PATENT DOCUMENTS

| | | |
|---|---|---|
| EP | 0961197 | 12/1999 |
| EP | 1076290 | 2/2001 |
| JP | 63085960 | 4/1988 |
| JP | 401173140 A | 7/1989 |
| JP | 3191429 | 8/1991 |

| | | |
|---|---|---|
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |

OTHER PUBLICATIONS

U.S. Appl. No. 60/191,662, Moore et al.
U.S. Appl. No. 60/203,081, Ben-Natan et al.
"Architecture for a Dynamic Information Area Control" IBM Technical Disclosure Bulletin IBM Corp. New York US vol. 37 No. 10 Jan. 10, 1994. pp. 245-246.
Alschuler Liora "A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.
Au Irene et al. "Netscape Communicator's Collapsible Toolbars" CHI'98 Human Factors in Computing Systems Conference Proceedings Los Angeles CA Apr. 18-23, 1998 pp. 81-86.
Battle Steven A. et al.; "Flexible Information Presentation with XML" 1998 The Institution of Electrical Engineers 6 pages.
Brogden William; "Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.
Chen Yi et al.: A; "XKvalidator: A Constraint Validator for XML" CIKM '-2 Nov. 4-9, 2002 Copyright 2002 ACM 1-58113-492-4/02/0011 pp. 446-452.
Ciancarini Paolo et al.; "Managing Complex Documents Over the WWW: A Case Study for XML" IEEE Transactions on Knowledge and Data Engineering vol. 11 No. 4 Jul./Aug. 1999. pp. 629-938.
Davidow Ari; "XML Editors: Allegations of Functionality in search of reality" INTERNET 'Online! 1999 XP002230082 retrieved from the Internet <URL:http://www.ivritype.com/xml/>.
Kanemoto Hirotaka et al; "An Efficiently Updatable Index Scheme for Structured Documents" 1998 IEEE pp. 991-996.
Sutanthavibul Supoj et al.; "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].
Usdin Tommie et al.; Not a; "XML: Not a Silver Bullet But a Great Pipe Wrench" Standardview vol. 6. No. 3 Sep. 1998 pp. 125-132.
Chien Shu-Yao et al.; "Efficient Management of Multiversion Documents by Object Referencing" Proceedings of the 27th VLDB Conference 2001 pp. 291-300.
Chien Shu-Yao et al.; "Efficient schemes for managing multiversion XML documents" VLDB Journal (2002) pp. 332-352.
Chien Shu-Yao et al.; "Storing and Querying Multiversion XML Documents using Durable Node Numbers" IEEE 2002 pp. 232-241.
Chien Shu-Yao et al.; "XML Documents Versioning" SIGMOD Record vol. 30 No. 3 Sep. 2001 pp. 46-53.
Dyck Timothy; "XML Spy Tops as XML Editor" http://www.eweek.com/article2/0395972404100.asp, Nov. 25, 2002, 4 pages.
Haukeland Jan-Henrick; "Tsbiff—tildeslash biff—version 1.2.1" Internet Document [Online] Jun. 1999 URL: http://web.archive.org/web/19990912001527/http://www.tildeslash.com/tsbiff/.
Nelson Mark; "Validating with MSXML and XML Schema" Windows Developer Magazine Jan. 2002 pp. 35-38.
Netscape Communication Corporation; "Netscape Communicator 4.61 for OS/2 Warp" Software 1999 The whole software release & "Netscape—Version 4.6 [en]-010615" Netscape Screenshot Oct. 2, 2002.
Noore A.; "A secure conditional access system using digital signature and encryption" 2003 Digest of Technical Papers. International Conference on Consumer Electronics Jun. 2003 pp. 220-221.
Rogge et al.; "Validating MPEG-21 Encapsulated Functional Metadata" IEEE 2002, pp. 209-212.
Wong, Raymond K. et al.; "Managing and Querying Multi-Version XML Data with Update Logging" DocEng '02 Nov. 8-9, 2002 Copyright 2002 ACM 1-58113-594-7/02/0011 pp. 74-81.
Chen Ya Bing et al.; "Designing Valid XML Views" ER 2002 LNCS 2503 2002 Springer-Verlag Berlin Heidelberg 2002 pp. 463-477.
Chuang Tyng-Ruey; "Generic Validating of Structural Content with Parametric Modules" ICFP '01 Sep. 3-5, 2001 Copyright 2001 ACM 1-58113-415-0/01/0009 pp. 98-109.
Dayton Linnea and Jack Davis; "Photo Shop 5/5.5 WOW! Book" 2000 Peachpit Press pp. 8-17.
Hall Richard Scott; "Agent-based Software Configuration and Deployment" Thesis of the University of Colorado Online Dec. 31, 1999 retrieved from the Internet on Nov. 7, 2003: <http://www.cs.colorado.edu/users/rickhall/documents/ThesisFinal.pdf> 169 pages.
Hardy Mathew R. B. et al; "Mapping and Displaying Structural Transformations between XML and PDF" DocEng '02 Nov. 8-9, 2002 Copyright 2002 ACM 1-58113-597-7/02/0011 pp. 95-102.
Kim Sang-Kyun et al.; "Immediate and Partial Validation Mechanism for the Conflict Resolution of Update Operations in XML Databases" WAIM 2002 LNCS 2419 2002 pp. 387-396 Springer-Veriag Berlin Heidelberg 2002.
Netscape Communication Corp; "SmartUpdate Developer's Guide" Online Mar. 11, 1999 retrieved from the Internet on Dec. 8, 2000: <http://developer.netscape.com:80/docs/manuals/communicator/jarman/index.htm> 83 pages.
Tomimori et al.; "An Efficient and Flexible Access Control Framework for Java Programs in Mobile Terminals"; 22nd International Conference on Distributed Computing Systems Workshop; 2002; pp. 777-782.
Van Hoff Arthur et al.; "The Open Software Description Format" Online Aug. 13, 1997 retrieved from the Internet on Nov. 7, 2003: <http://www.w3.org/TR/NOTE-OSD> 11 pages.
Verlamis Iraklis et al.; "Bridging XML-Schema and relational databases. A System for generating and manipulating relational databases using valid XML documents." DocEng '01 Nov. 9-10, 2001 Copyright 2001 ACM 1-58113-432-0/01/0011 pp. 105-114.
Williams Sara et al.; "The Component Object Model" A Technical Overview, Oct. 1994, Microsoft Corp., pp. 1-14.
Pacheco et al., "Delphi 5 Developer's Guide," Sams Publishing, 1999, Chapter 31 Section: Data Streaming, 6 pages.
"Netscape window," Netscape Screenshot Oct. 2, 2002.
Clarke P., "From small beginnings" Knowledge Management Nov. 2001, pp. 28-30.
Hwang et al., "Micro-Firewalls for Dynamic Network Security with Distributed Intrusion Detection"; IEEE International Symposium on Network Computing and Applications; 2001; pp. 68-79.
Kaiya et al., "Specifying Runtime Environments and Functionalities of Downloadable Components Under the Sandbox Mode"; International Symposium on Principles of Software Evolution; 2000; pp. 138-142.
Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.
Sun Q. et al., "A robust and secure media sugnature scheme for JPEG images" Proceedings of 2002 IEEE Workshop on Multimedia Signal Processing, Dec. 2002, pp. 296-299.
Prevelakis et al., "Sandboxing Applications"; Proceedings of the FREENIX Track; 2001; pp. 119-126.
Schmid et al., "Protection Data from Malicious Software"; 18th Annual Computer Security Applications Conference; 2002; pp. 199-208.
Trupin J., "The Visual Programmer," Microsoft Systems Journal, Apr. 1996, pp. 103-105.
Zdonik S., "Object Management System Concepts," ACM, 1984, pp. 13-19.
"Store and Organize Related Project Files in a Binder," Getting Results with Microsoft Office, 1990, pp. 109-112.

Barker et al., "Creating In-Line Objects Within An Integrated Editing Environment," IBM Technical Disclosure Bulletin, vol. 27, No. 5, Oct. 1984, p. 2962.

Berg, A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascia et al., "Sweeper" Microsoft Interactive Developer, vol. 1, No. 1, 1996, 27 pages.

Herzner et al., "CDAM-Compound Document Access and Management. An Object-Oriented Approach" Multimedia Systems Interaction and Applications, 1992, Chapter 3, pp. 17-36.

Kobayashi et al., "An Update on BTRON-specification OS Development" IEEE 1991 pp. 132-140.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Clark James—W3C Editor; "XSL Transformation (XSLT) Verison 1.0," Nov. 16, 1999, W3C (MIT INRIA Kejo) pp. 1-156.

Description of Whitehill Composer software product by Whitehill Technologies Inc. available at <http://www.xml.com/pub/p/221> accessed on Apr. 8, 2004, two pages.

McCright J.S.; "New Tool Kit to Link Groove with Microsoft Sharepoint" eWeek Enterprise News & Reviews, Ziff Davis Media Inc., Jul. 29, 2002, 1 page.

Musgrave S; "Networking technology—impact and opportunities" Survey and Statistical Computing 1996. Proceedings of the Second ASC International Conference. Sep. 1996. pp. 369-378. London UK.

Rapaport L; "Get more from SharePoint" Transform Magazine, vol. 11 No. 3, Mar. 2002, pp. 13-15.

W3C Editors James Clark et al.; "XML Path Language (XPath) Version 1.0" Nov. 16, 1999, W3C (MIT INRIA Kejo), pp. 1-49.

OMG XML Metadata Interchange (XMI) Specification Version 1.2 Jan. 2002.

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertinent Pages: 1-9, 18-25, 85-89, 98-101, 106-113, 124-127, 144-147, 190-201, 209-210, 218-227, 581-590, 632-633, 650-655, 712-714.

Leblond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Atova, "User Reference manual Version 4.4, XML Spy suite 4.4," Atova Ges.m.b.H and Altova, Inc., May 24, 2002, pages cover, copyright page. 1-565.

Altova et al. XML Spy, XML Integrated Development Environments, Altova Inc., 2002, pp. 1-18.

Ben-Natan, U.S. Appl. No. 60/203,081, filed May 9, 2000, entitled "Internet platform for creating and supporting communities".

Ixia Soft, "Streamlining content creation, retrieval, and publishing on the Web using TEXTML Server and SML Spy 4 Suite in an integrated, Web publishing environment," (Partner's Whitepaper; published on the Web as of Jun. 6, 2002, downlowad pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

Altova, Inc., "XML Spy 4.0 Manual," Altova Inc. & Altova GmbH, coyright 1998-2001, Chapters 1, 2, and 6, encompassing pp. 1-17, 18-90, and 343-362.

Cybook, INC.: "Copying the Search Form to Services-based Web Sites" INternet Article, (online) Jul. 26, 2004.*the whole document*.

Excel Developer Tip (hereinafter "Excel"), "Determining the Data Type of a Cell", May 13, 1998, p. 1 (available at http://jwalk.com/ss//excel/tips/tip62.htm).

Macromedia, INC.: "Dreamweaver Technote, Changes in copying and pasting in Dreamweaver 4" Internet Article (online). *the whole document*.

Rado, Dave: "How to create a template that makes it easy for users to "fill in the blanks", without doing any programming" Micosoft Word MVP FAQ Site, (online) Apr. 30, 2004, the whole document.

Cover, XML Forms Architecture, retrieved at <<http://xml.coverpages.org/xfa.html>> on Aug. 17, 2006, Coverpages, Jun. 16, 1999.

Raggett, "HTML Tables", retrieved on Aug. 6, 2006, at <<http://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE, html>>, Jupitermedia Corporation, 2006, pp. 7.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997),pp. 42-43, 54-58.

"Microsoft Word 2000", Screenshots,(1999), 1-5.

Beauchemin, Dave, "Using InfoPath to Create Smart Forms", Retrieved from the Internet at http:/www.mircosoft.com/office/infopath/prodinfo/using.mspx on Jan. 21, 2007,(Mar. 27, 2003).

Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Borland, Russo , "Running Microsoft Word 97", 314-315, 338, 361-362, 390, and 714-719.

Brabrand, et al., "Power Forms Declarative Client-side Form Field Validation", (2002),1-20.

Dubinko, Micah , "XForms and Microsoft InfoPath", Retrieved from the Internet at http://www.xml.com/lpt/a/1311 on Jan. 21, 2007,(Oct. 29, 2003).

Hoffman, Michael , "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro , et al., "A Dynamic User Interface for Document Assembly", Department of Computer Science, University of Helsinki,(Nov. 2002).

Nelson, Joe , "Client-side Form Validating Using JavaScript", *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan , "Microsoft InfoPath 2003 By Example", Retrieved from the Internet at http://www.perfectxml.com/InfoPath.asp on Jan. 21, 2007,(Apr. 20, 2003).

Udell, Jon , "InfoPath and XForms", Retrieved from the Internet at http://weblog.infoworld.com/udell/2003/02/26.html,(Feb. 26, 2003).

Anat, Eyal et al., "Integrating and Customizing Hereogeneous E-Commerce Applications", The VLDB Journal-The International Journal on Very Large Data Bases, vol. 10, Issue 1, (Aug./2001), 16-38.

Adams, Susie et al., "BizTalk Unleashed", Sams publishing, 2002, first printing Mar. 2001, (Mar./2001), 31-138.
Vasters, Clemens F., "BizTalk Server 2000 A Beginner's Guide", Osborne/McGraw-Hill, (2001), 1-2, 359-402.
Halberg, Bruce et al., "Using Microsoft Excel 97", (1997), 191-201, 213-219.

Villard, et al., "An Incremental XSLT Transformation Processor for XML Document Manipulation", http://www2002.org/CDROM/refereed/321, Printed on May 18, 2007, (May 2002), 25 pages.

* cited by examiner

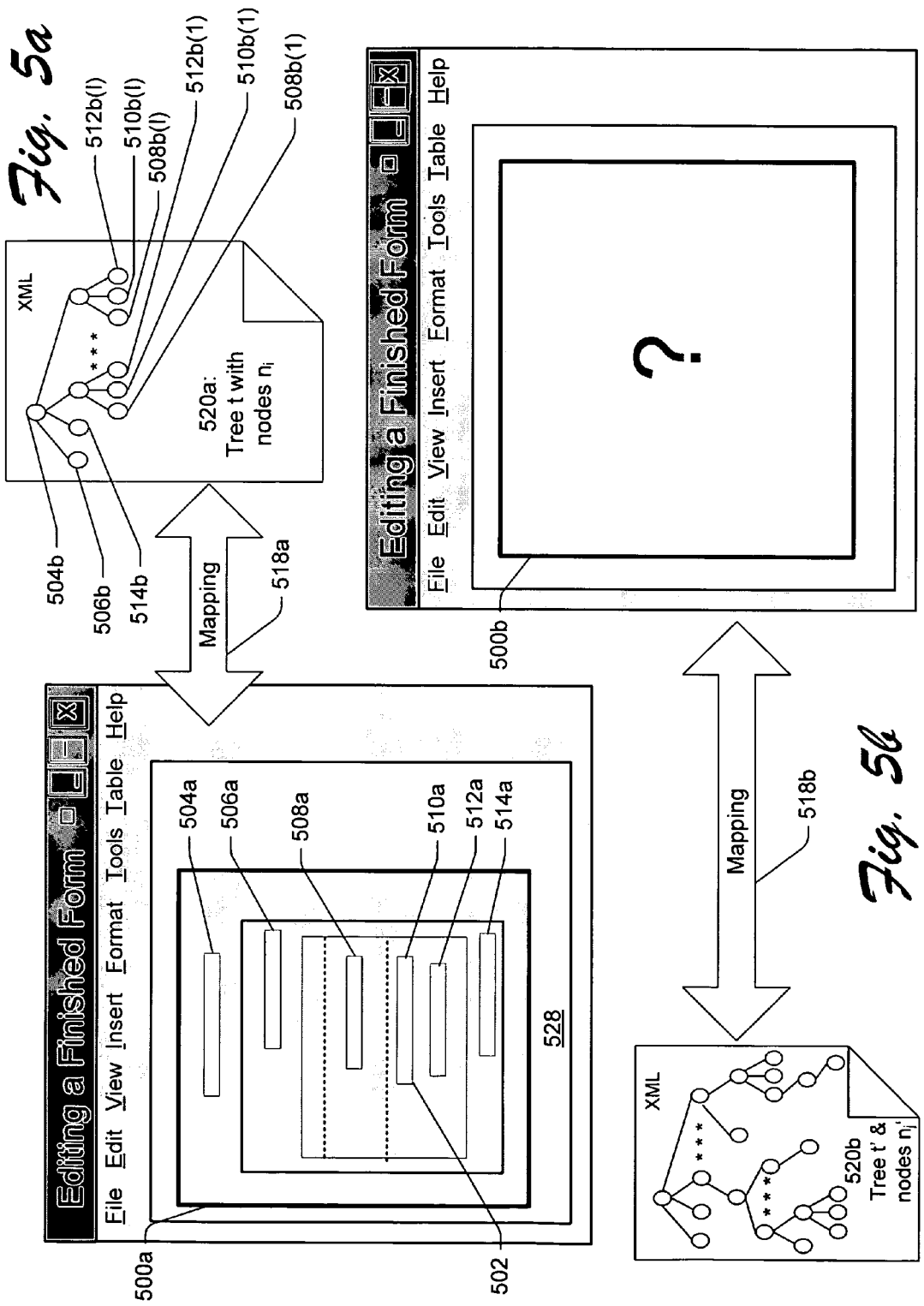

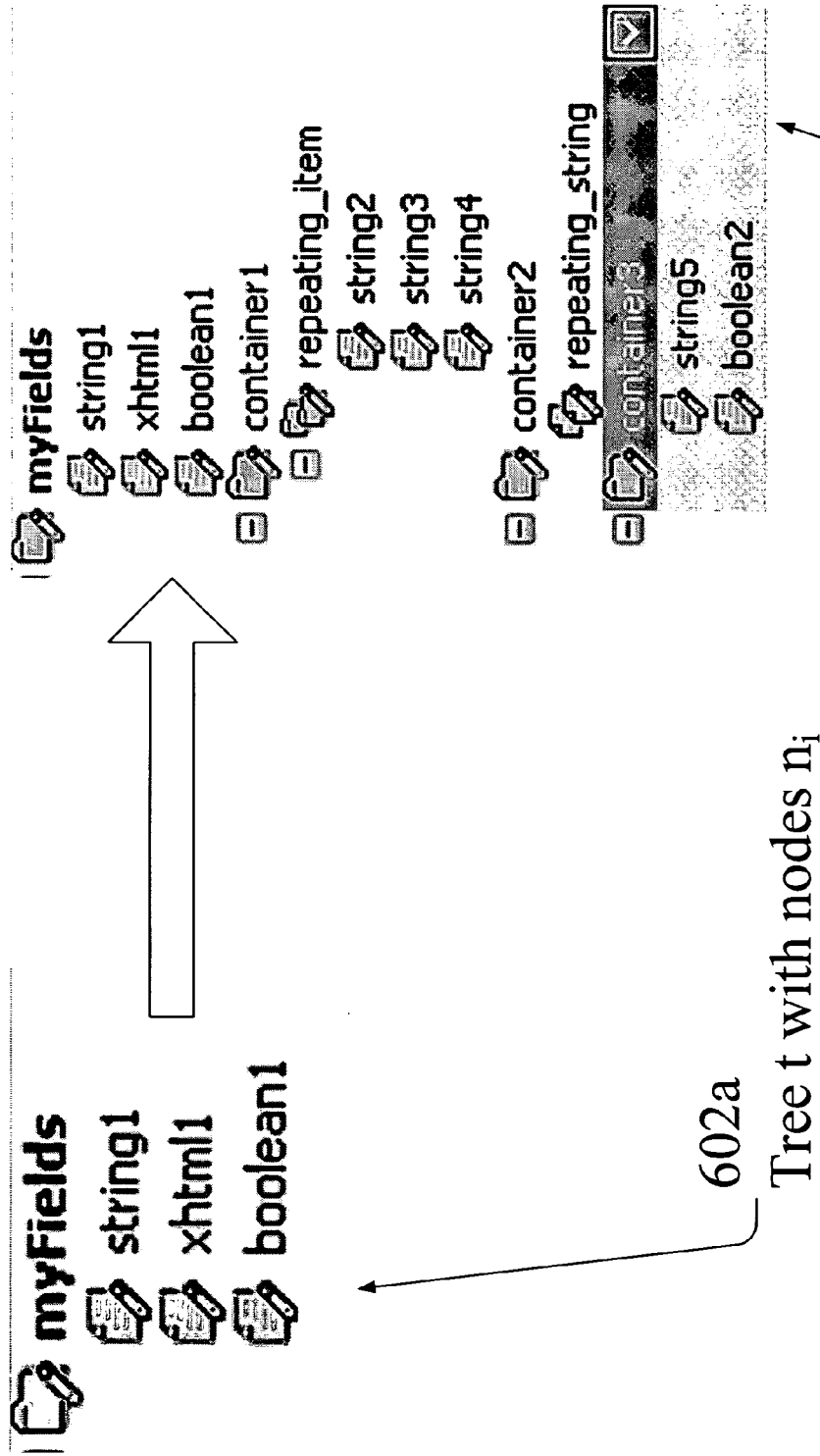

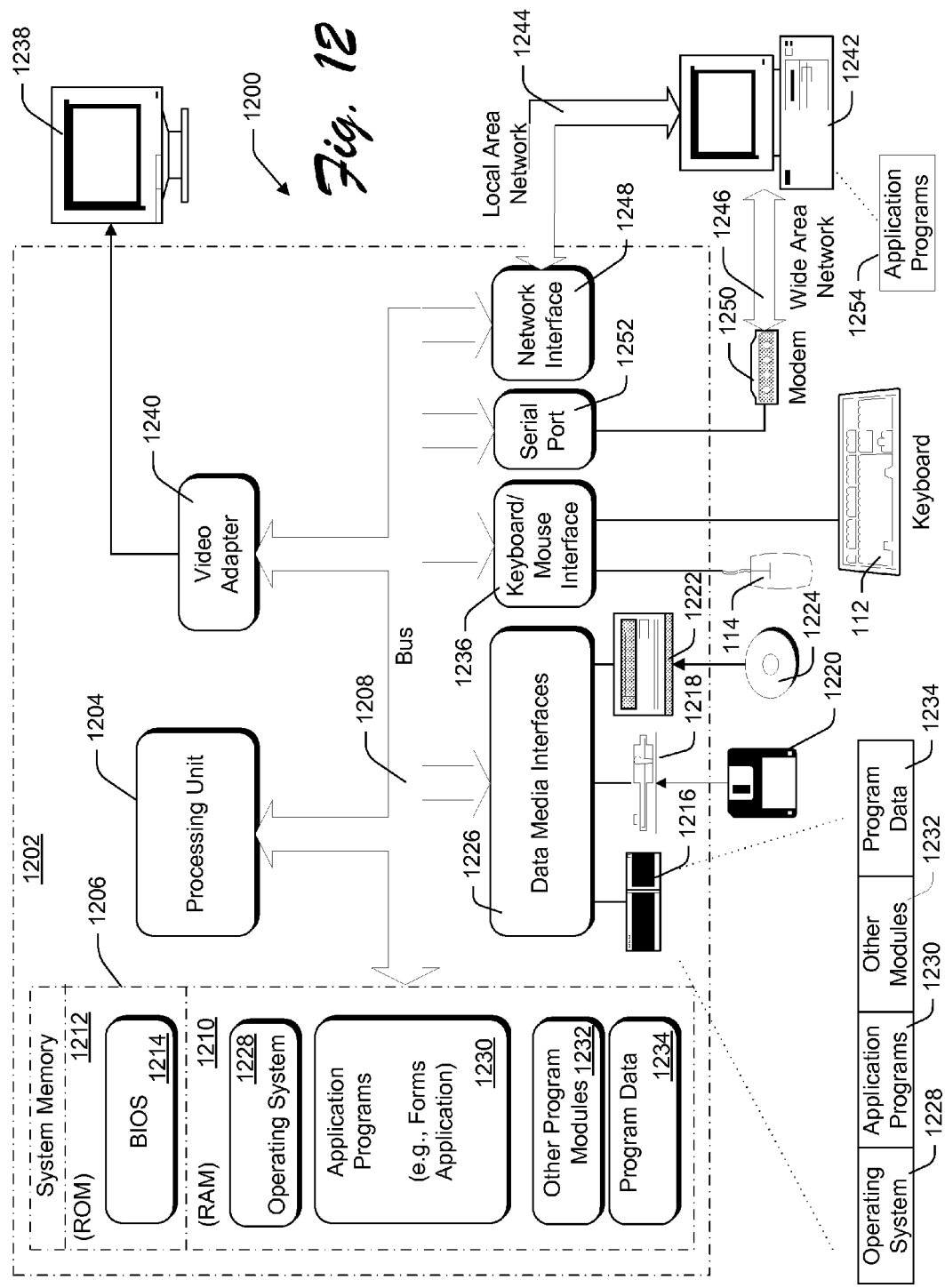

FORM TEMPLATE DATA SOURCE CHANGE

TECHNICAL FIELD

This invention relates to a structured data source around which a form template is designed for a visual presentation in which the data in the structured data source is interactively edited, and is more particularly related to detecting changes made to the data source and updating dependencies between various pieces of the form template and the changed data source.

BACKGROUND

FIG. 1 shows an environment in which a data processing application 100 is executed so as to edit a structured document by processing documents containing structured data 102. The data processing application 100 is exemplary and can generally be described as processing structured data 102 expressed in a markup language so as to transform the structured data 102 using a solution module 104 to produce transformed information. During the process, the structured data can be presented as a rendering of a visual surface 106 (also referred to herein as a document view 106) on an output device. An editing user 108 interacts with the visual surface 106, as indicated by arrow 110, using, for instance keyboard 112, mouse device 114, or some other input device. The visual surface 106 can constitute the presentation of an electronic form having data entry fields associated with the structured data 102. In this case, the editing user 108's interaction 110 can involve the editing user 108 filling information into existing data entry fields of the electronic form, inserting and filling in new fields (as in table rows) or deleting or substituting regions of the editing surface that represent data subtrees.

The structured data 102 is a markup language. By way of example, and not by way of limitation, the markup language can be represented in Extensible Markup Language (XML). Accordingly, the structured data 102 is hereinafter referred to as an XML document 102. XML, which is documented as a W3C Standard set forth in Paoli et al., 1998, W3C recommendation, enables developers to create customized tags that describe the meaning of data, as opposed to the presentation of data.

The environment in which the data processing application 100 operates includes an Extensible Stylesheet Language Transformations (XSLT) processor that translates an XML document 102 into the visual surface 106 The visual surface 106 can also comprise another XML document, or a document expressed in a presentation-oriented markup language, such as Hypertext Markup Language (HTML). XML provides tags that represent the data contained in a document. In contrast, presentation-oriented languages, such as Hypertext Markup Language (HTML), provide tags that convey the visual appearance of a document. Accordingly, these technologies complement each other; XML allows information to be efficiently transferred and processed, while HTML allows information to be presented for display.

XSLT itself uses an XML syntax. The XSLT processor performs its translation function by making reference to one or more XSLT stylesheets. The XSLT stylesheets contain a collection of rules for mapping elements in the XML document 102 to the visual surface 106 or document view 106. To perform this function, XSLT defines its operands through XPath. XPath is a general-purpose query language for addressing and filtering the elements and text of XML documents. XPath expressions can address parts of an XML document, and can manipulate strings, numbers, and booleans, etc. In the context of the XSLT processor, XPath expressions can be used to select a portion of the XML document 102 that matches a prescribed match pattern, and then perform some translation operation on that portion using a rule provided in the XSLT stylesheets. XML, XSLT, and XPath are described at length in their governing specifications provided by the World Wide Web Consortium (W3C).

The XML document 102 is composed of XML elements, each of which includes a start tag (such as <author>), an end tag (such as </author>), and information between the two tags (which is referred to as the content of the element). An element may include name-value pairs (referred to as attributes) related by an equal sign (such as MONTH="May"). The elements in the XML document 102 have a hierarchical relationship to each other that can be represented as a data tree 116. The elements in the data tree 116 are also commonly referred to as "nodes." All elements are nodes, but the converse is not true. Data tree 116 is also referred to as a tree t having nodes n, where tree t and nodes n. As used herein, attributes, attribute values, and text content are all nodes.

A so-called XML schema (not illustrated in FIG. 1) is a particular XML language that provides a syntactic description of an XML structure, for instance XML document 102 and its corresponding data tree 116. If an XML structure is an instance of the schema that it refers to, it is said to be valid according to that schema. Stated otherwise, nodes in the schema are defined using syntactic constructs. For instance, constructs can be used to group nodes that do not have a common explicit parent (e.g., repeating sequences of nodes).

The solution module 104 includes a data mapping module 118. The purpose of the data mapping module 118 is to map the structured data 102 to the visual surface/document view 106. The data mapping module 118 can perform this task using so-called stylesheets, such as stylesheets written using XSLT. XSLT maps the structured data 102 to a format appropriate for presentation, such as HTML, Extensible Hypertext Markup Language (XHTML), etc. In other words, documents expressed in XML include tags that are particularly tailored to convey the meaning of the data in the documents. The XSLT conversion converts the XML documents into another markup language in which the tags pertain to the visual presentation of the information contained in the documents. (To facilitate discussion, the following description assumes the use of HTML to render the documents; however, other presentation-oriented markup languages can be used to render the documents.) Because HTML is a markup language, it can be conceptualized as a view tree 120 that includes a hierarchical organization of nodes, as in the case of data tree 116.

The schema for data tree 116 can have a node n that represents a table or a repeating field, where the node n can correspond to many nodes in the actual data for data tree 116, as well as many nodes in a form template 130 displayed on the visual surface 106. By way of example, the schema can define a format for one (1) date field as to what the date should look like and can define that many dates can be entered in succession for that one date field. Accordingly, there can be a corresponding number of nodes for the dates in the data for the data source as well as in the form template 130 for the visual surface 106. The data source, however, will have only one (1) node for the date field. The reader is referred to the World Wide Web Consortium's specifications for background information regarding XML and XSLT.

Arrow 126 represents mapping of information from tree t having nodes n within the data tree 116 to information in the view tree 120.

A view mapping module 122 enables nodes in the data tree 116 to be mapped to corresponding nodes in the view tree 120, and vice versa. The mapping of nodes in the view tree 120 to nodes in the data tree 116 allows the solution module 104 to correlate editing operations performed on the visual surface/document view 106 with corresponding nodes in the underling structured data 102. This allows the solution module 104 to store information entered by the editing user 108 at appropriate locations within the structured data 102 during an editing session. Arrow 124 represents the mapping of information in the view tree 120 back to associated information in the data tree 116.

By way of broad overview, the view mapping module 122 provides mapping between the visual surface/document view 106 and the XML document 102 by adding annotations to the view tree 120 used to render the visual surface/document view 106. These annotations serve as references which point back to specific locations in the data tree 116. FIG. 1 represents the annotation of the visual surface/document view 106 by showing an annotated HTML document 128 being output from the solution module 104.

The visual surface/document view 106 itself has an appearance that is determined by both the information contained in the XML document 102 as well as the effects of the XSLT transformation provided by the data mapping module 118. Generally, in the case of electronic forms, the visual surface/document view 106 typically includes a hierarchical structure which is related to the hierarchical structure in the XML document 102. For instance, the exemplary electronic form template 130 includes multiple sections pertaining to different topics that reflect the topics in the XML document 102. (However, it is not necessary to have a one-to-one direct correspondence between the organization of the XML document 102 and the organization of the visual surface/document view 106; in other words, the transformation of the XML document 102 to the visual surface/document view 106 is generally considered non-isomorphic). Each section in the exemplary electronic form template 130 can include one or more data entry fields for received input from the editing user 108, such as data entry field 132. The data entry fields are also referred to herein as "editing controls." Different graphical components can be used to implement the editing controls, including text boxes, drop-down list boxes, list boxes, option buttons (also referred to as radio buttons), check boxes, and so on. FIG. 5a, to be described below, provides examples of the visual appearance of an electronic form template as it is being used by an editing user to enter and/or edit data via the data entry fields thereon.

Path 134 generally represents the routing of information entered via the electronic form template 130 back to the XML document 102. In another words, the data entry fields in the electronic form template 130 (such as data entry field 132) are associated with respective nodes in the data tree 116. Entry of information via electronic form template 130 will therefore prompt the solution module 104 to route such information to appropriate storage locations in the data tree 116. Again, the linking between the electronic form template 130 and the XML document 102 is provided by the view mapping module 122.

The functionality provided by the solution module 104 is defined, in part, by a solution file, such as exemplary solution file 136 stored in storage 138. The solution file 136 essentially constitutes an electronic form template, providing all of the semantic information required to transform the XML document 102 into the visual surface/document view 106. Different XML documents may have been created by, or otherwise refer to, different electronic form templates. Accordingly, different XML documents may have different solution files associated therewith. Various techniques can be used to retrieve a solution file that is associated with a particular XML document. For instance, an appropriate solution file can be retrieved based on URN (Uniform Resource Name) or URL (Uniform Resource Locator) information contained in the header of an input XML document. That header information links the input document to a corresponding solution file. A storage 140 represents an archive for storing one or more XML documents created by, or otherwise associated with, respective solution files.

FIG. 2 shows an exemplary composition of the solution file 136. As shown there, the solution file 136 contains a collection of files (202, 204, 206, 208, and 210) that together provide semantic information used, in part, to implement the solution module 104. This collection of files can be packaged together. In one exemplary implementation, this collection of files is referred to using an extension '.xsn'. A form definition file 202, also called a manifest file, forms the centerpiece of the collection. The form definition file 202 contains information about all of the other files in the solution module 104. A design component which is used when an electronic form is being created so as to contain various editing controls, including text boxes, drop-down list boxes, list boxes, option buttons (also referred to as radio buttons), check boxes, and so on. Some of these controls may be included in the forms definition file 202. This file 202 is assigned the exemplary extension '.xsf'.

A schema file 204 is used to constrain and validate the XML document 102. This file is assigned the exemplary extension '.xsd'. View files 206 are used to transform the XML document 102, for presentation as views (visual surfaces 106). These files are used to implement the data mapping module 118 discussed in connection with FIG. 1. There can be multiple view files 206 corresponding to multiple possible views (i.e., visual surfaces 106) that the editing user 108 can select from. The view files 206 are assigned the exemplary extension '.xsl'. A default data file 208 contains default data that can be initially displayed in the view when an editor user 108 first opens the electronic form, and has not yet begun to edit the fields. This file 208 is assigned the exemplary extension .xml. Finally, business logic files 210 provide programming code used to implement specific editing behavior, data validation, event handlers, control of data flow, and other features. Such programs can be written in any kind of language, such as the JScript® or VBSCRIPT scripting languages. In this case, these files are assigned the exemplary extensions 'js' or '.vb' (for JScript® and VBSCRIPT scripting languages, respectively).

FIG. 3 shows an exemplary architecture 300 for an electronic forms application that can be used to both create and fill out an electronic form. The architecture 300 includes a solution design component 302 for building a solution corresponding to a data file for which the electronic form can be used, an XML runtime component 304 to enter and view data in the electronic form, and optionally one or more exemplary XML solutions 306. Each of the components of the architecture 300 will now be discussed.

The solution design component 302 of the architecture 300, such as is seen at reference numeral 302 in FIG. 3, allows a solution to be built. The solution design component 302 provides a user interface (UI) to handle all the design requirements for common XML solutions. The result of the solution design component 302 is the set of files that represent a corresponding XML solution file 136. The structure of the XML solution file 136 declaratively defines the output of the solution design component 302. Included in the solution design component 302 are an XSL editor and solution builder 310. Any script editor can be used to edit business logic script used in the electronic form. The supporting files 312 communicate with one or more application files 308 that are useful in building the XML solution file 136 for an XML document 102.

In one implementation, the solution design component 302 provides a WYSIWYG forms designer and editor based on XML standards that can be used for generic XML schemas. As such, XSL editor and solution builder 310 need not be characterized as including an XML editor. Moreover, notepad 314 and support files 312 need not be present.

The runtime component 304 includes an editor frame 320 that includes XML editing 322. The XML editing 322 includes capabilities for an Instantiated Content Model (ICM). The ICM, as previously disclosed, allows for a minimized expression of all of the possible portions of the XML fragments that can be inserted or deleted when the electronic form is being filled out by the editing user 108. This minimized expression in turn reduces the size of the solution infrastructure 324, discussed below, which in turn improves the performance of the rendering of the electronic form. The XML editing 322, in conjunction with the instantiated content model, enables the editing user 108 to validly fill out the electronic form without latency induced by the size of the solution infrastructure 324.

In addition to the foregoing, the editor frame 320 bidirectionally communicates with the solution infrastructure 324, such as XML solution 302 seen in FIG. 3. Each of the solution infrastructure 324 and the XML store 316 bidirectionally communicates with one of more XML documents 330. Additionally, the solution infrastructure 324 communicates with the one or more application files 308. As seen in FIG. 2, the XML document 102 points to the solution file 136 that should process the XML document 102 on a computing device (e.g., a personal computer). When the editing user 108 uses the computer device to navigate to the XML document 102, the solution infrastructure 324 loads the required solution file 136. If needed, the solution file 136 handles any contextual user interfaces (UI), runs business logic associated with the XML document 102 (e.g., business logic 210), and enforces security for all operations of the computing device.

The XML solution infrastructure 324 allows the editing user 108 of the computing device to access various XML data sources on the computing device, in an intranet, as well as on an extranet or the World Wide Web. Given the foregoing, XML Documents 330 can be displayed and edited using the XML Editing 322 of the editor frame 320.

Various exemplary solution files 340 can be provided to the editing user 108 of the computing device as part of the architecture 300, where the editing user 108 would like to see sample or exemplary solutions from which the user can learn about the data processing application 100. Exemplary solution files 340 can provide the editing user 108 with a guide for customizing electronic forms and for building new solutions based on the exemplary solutions.

FIG. 4 shows an overview of an exemplary apparatus 400 for implementing the data processing application 100 shown in FIG. 1. The apparatus 400 includes a computer 402 that contains one or more processing units 404 and memory 406. Among other information, the memory 406 can store an operating system 408 and the above-described data processing application 100, identified in FIG. 4 as a forms application 410. The forms application 410 can include data files 412 for storing the structured XML document 102, and a solution module 414. The solution module 414 comprises logic that specifies the appearance and behavior of the visual surface 106 as was described in connection with FIG. 1. The logic provided by solution module 414 is, in turn, determined by a solution file (such as a solution file 136 composed of the files shown in FIGS. 1-2). The computer 402 is coupled to a collection of input devices 416, including the keyboard 112, mouse device 114, as well as other input devices 418. The computer 402 is also coupled to a display device 420.

In one exemplary implementation, the forms application 410 includes a design mode and an editing mode. The design mode presents a design UI 422 on the display device 420 for interaction with a designing user 424. The editing mode presents an editing UI 426 on the display device 420 for interaction with the editing user 108. In the design mode, the forms application 410 creates an electronic form 428, or modifies the structure of the electronic form 428 in a way that affects its basic schema. In other words, the design operation produces the solution file 136 that furnishes the electronic form 428. In the editing mode, the editing user 108 uses the electronic form 428 for its intended purpose—that is, by entering information into the electronic form 428 for a business-related purpose or other purpose.

In the design mode, the forms application 410 can be configured to depict the electronic form 428 under development using a split-screen display technique. More specifically, a forms view portion 430 of the design UI 422 is devoted to a depiction of the normal appearance of the electronic form 428. A data source view portion 432 of the visual surface is devoted to displaying a hierarchical tree 434 that conveys the organization of data fields in the electronic form 428.

An exemplary designing UI 422 can allocate the visual surface 206 into the forms view portion 430 and the data source view portion 432. As described above, the forms view portion 430 contains a depiction of the normal appearance of the electronic form 428—in this case, an exemplary form template 500a seen in FIG. 5a. The electronic form 428 can includes a plurality data entry fields. The data source view portion 432 includes the hierarchical tree 434 showing the nested layout of the data entry fields presented in the electronic form.

The forms application 410 provides multiple techniques for creating the electronic form. According to one technique, the electronic form can be created from scratch by building the electronic form from successively selected editing controls. In another technique, the electronic form can be created based on any pre-existing .xsd schema document (e.g., see schema 204 in FIG. 2) loaded into the forms application 410. The .xsd schema is an XML file that defines the structure and content type of the XML files that are associated with it. In another technique, the electronic form can be created based on an XML document or file. The forms application 410 will then create a schema based on the information in the input XML document or file. In another technique, the electronic form can be created based on a database schema. In this case, the forms application 410 will extract the schema of the data and convert that record set to an XML representation. Still other techniques can be used to create electronic forms.

Once a form has been created, its design (and associated schema) can be further modified. For example, the forms application 410 allows the designing user 424 to modify existing editing controls used in the electronic form, or add additional editing controls.

The creation of the electronic form also creates an associated solution file. The solution file effectively forms a template that can be archived and subsequently used in a business (or other environment). FIG. 5a demonstrates an exemplary use of the exemplary electronic form 500 after it has been created in the design mode of operation of the forms application 410. More specifically, FIG. 5a shows the presentation of the exemplary electronic form 500a in the editing mode of operation of the forms application 410. In this case, the editing user 108 can enter data into the data entry fields in the editing UI 426. For instance, the editing user 108 can enter text at reference numeral 502 into a text field 510a. The editing user 108 can select a particular part of the exemplary electronic form 500a in a conventional manner, such as by pointing to and clicking on a particular field in the exemplary electronic form using the mouse device 114.

Data entry fields in the electronic form are mapped to underlying structured XML document 102—in this case, an XML document 520a which is represented as a tree t having a plurality of nodes $n_i$. This mapping is achieved via annotations added to the HTML document used to render the exemplary electronic form 500a. More specifically, the annotations act as references which point to particular parts of the XML document 520a associated with the data entry fields in the exemplary electronic form 500a. Through this mechanism, the data entered by the editing user 108 is routed back to the XML document 520a and stored in its data structure at appropriate locations. This mapping functionality is represented in FIG. 5a by the arrow 518a.

One exemplary implementation includes a method that applies an XSLT stylesheet to an XML document to create an HTML view. At least some of the HTML elements in the HTML view are associated with a specifically named attribute. The HTML elements that are associated with the specifically named attribute have respective corresponding XML nodes in the XML document, where the location of each XML node in the XML document is determined by the value of the specifically named attribute. Once edits to the HTML elements associated with the specifically named attribute have been received in an interactive session with an editing user, the received edits are saved back into the nodes in the XML document that respectively correspond to the HTML elements associated with the specifically named attribute.

Electronic form 500a is displayed in the editing UI 528 by the forms application 410 so that an editing user 108 can enter data into the depicted data entry fields of a corresponding data entry screen. The data entry fields 504a, 506a, 508a, 510a, 512a, and 514a on the data entry screen are being used to collect information. Information is kept in a schema associated with the underlying structured XML document 102 represented by the XML document 520a as to what will be considered to be valid data that can be entered into the data entry fields for the electronic form 500a. Once validated, these data are then subjected to a mapping operation 518a for entry into the XML document 520a. Business logic for validation of the data being entered can be quite varied and can be stored so as to be associated as definitions for the electronic form 500a (i.e., in FIG. 2, see form definition (.XSF) 202 and business logic file 210 for storage of validation criteria).

Each data entry field has a corresponding place in the XML document 520a seen in FIG. 5a. The data entry fields 504a, 506a, 508a, 510a, 512a, and 514a respectively corresponds to the nodes 504b, 506b, 508b, 510b, 512b, and 514b in the XML document 520a. Repetitive sets of data can be entered for each field 506a, where each such data set can be represented by the data entry fields 508a-512a, and where each field 506a can have from zero to infinity different data sets. In this case, these data sets are represented in the XML document 520a by nodes 508b-512b(1-I), where from 1 to "I" different data sets can be provided for each field 506a.

The exemplary electronic form template 500a is designed around a data source, which here is XML document 520a, also referred to herein as a data tree 520a. After designing the electronic form template 500a, a form designer may wish to modify the data source. Referring now to FIGS. 5a-5b, the form designer may wish to modify data tree 520a, which can be understood as a tree t having nodes n that is to be modified into a tree t' having nodes n', as seen by a data tree 520b. A reason for such modifications can be that changes are needed after the data source 520a has been developed, where the data source definition (e.g., the schema for data source 520a) changes during development. Also, a first version of form template 500a that is designed against a first version of a data source 520a may need to be changed so as to create a second version of the form template 500b that is designed against a second version of that data source 520b. In these cases, it is desirable to reuse the previous forms design work by using the first version of the form template 500a as a starting place to design the second version of the form template 500b that is designed against the second version of that data source 520b.

Since there are a large number of dependencies between various pieces of information between the form template and the data tree (e.g., data source), it is difficult to change the data source into a new or modified data source while making accurate and precise changes that properly correspond to the form template. Examples of such dependencies include, but are not limited to, rules for validating data entered into fields of the form template, rules for binding a data entry field to a corresponding field in the data source, business logic, the promotion of properties from a data entry field to other data entry fields, initial formatting of data in a data entry field, etc. It would be an advantage in the art to provide an operation by which both an original data source and a new or modified data source can be specified. The operation would then detect changes between the original data source and the new or modified data source. The detected changes would then be used to make corresponding updates to dependencies in the form template. As a result, a correspondingly new or modified form template would be produced.

SUMMARY

According to one exemplary implementation, a first data source has a plurality of nodes each corresponding to a respective piece of a form template. Each piece of the form template has one of more dependencies to the corresponding node of the first data source. Dependencies can be bindings or validation of data. A second data source has a plurality of nodes. Differences are found between the first and second data sources by comparing each node in the first data source with a corresponding node in the second data source. The differences can be as to type, cardinality, name, or a movement, removal or addition of a node. The differences are used to update the dependencies of each piece of the form template to each node of the first data source. Each of the first and second data sources can be a document expressed in a markup language or in a web service definition language. Each of the first and second data sources can be a markup language document, a schema definition file, a web service definition file, a table for a server application, or a table for a database application.

According to another exemplary implementation, a first data source has first nodes and is represented by a first schema. A second data source has second nodes and is represented by a second schema. Each of the first and second schemas define validation of data. The first schema defines data entry fields in a form template. Each data entry field respectively corresponds to one or more the first nodes of the first data source. The first schema also defines a binding between each said data entry field in the form template and each said first node. A comparison is made, for each of the first nodes that corresponds to one of more of the second nodes, between the first and second schema to find a difference there between. The differences that are found are used to update the binding between each data entry field in the form template and one or more corresponding first nodes.

According to yet another exemplary implementation, first and second structured markup language documents each have syntax described by a schema and also have a plurality of markup language nodes that are arranged in a hierarchical structure of parent nodes having children nodes. The hierarchical position of each of the markup language nodes in the hierarchical structure is expressed as a corresponding fragment of the markup language. A form template has a plurality of data entry fields each corresponding to and having dependencies to one or more of the markup language nodes of the first structured markup language document. Differences are found between the respective schema and the differences are used to update the dependencies of each data entry field of the form template to the one of more corresponding nodes of the first structured markup language document. Each of the first and second structured markup language documents can be can be inferred from their respective schema.

Related computer readable media and apparatus are also described herein.

BRIEF DESCRIPTION OF THE DRAWINGS

FIGS. 5*a*-5*b* show exemplary user interfaces (UI) for editing an original and an updated electronic form, and which respectively correspond to an original data source and a modified data source.

FIGS. 6*a*-6*a* depict an original data source and a modified version thereof, respectively.

FIG. 12 shows an exemplary computing environment for implementing the data processing application shown in FIG. 1 and the forms application of FIG. 4.

Figure 1:
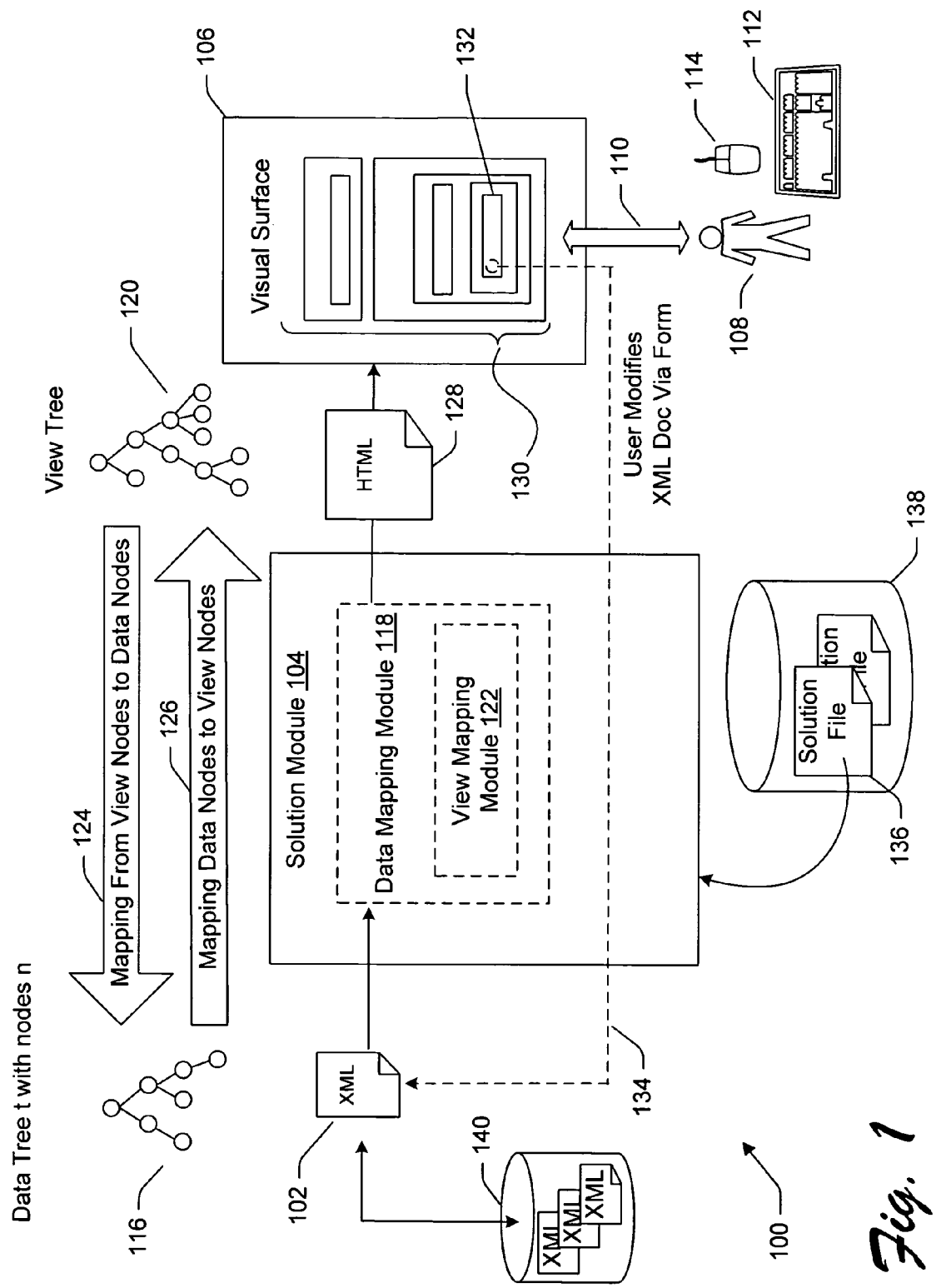
FIG. 1 shows an exemplary data processing application that includes mapping between structured data and a visual surface.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to a form template designed against a data source when the data source definition changes. This disclosure also pertains to taking a first version of a form template designed against a first data source and creating a second version of the form template against a second version of the data source by using and modifying the first version of the form template. This disclosure further pertains to functionality to add various types of data sources to a form template. By way of example, and not by way of limitation, various types of data sources that can be added to a form template, in accordance with the present disclosure include W3C Extensible Markup Language (XML) documents, W3C XML Schema Definition (XSD) files, W3C Web Service Definition Language (WSDL) based web services, Microsoft SQL server queries, and Microsoft Office Access queries.

The various types of data sources that can be added to a form template are represented by a definition. For instance, for a data source that is expressed as a tree t having nodes n, a schema defines the type of each node n in the tree t. The form template that corresponds to the tree t is a visualization of the schema for tree t, although a view doesn't necessarily need to involve all the nodes present in the schema. In the case where the data source for tree t is expressed in XML, an XSD (e.g., a kind of schema) defines the tree t, where the tree t is the whole data source. Stated otherwise, the schema more or less represents the data source, but more accurately the schema defines the syntax of the tree, while the XML represents an entry in a vocabulary that is defined by the schema. As such, a data source is specified by the sum of a schema and an instance (e.g., a generalized instance). As such, the XSD or schema defines the hierarchy of the nodes n of tree t and defines each node n of the hierarchy in tree t.

As stated, each data source is represented by its corresponding XSD schema in the disclosed forms application 410 for both designing the form template and validating user input and other data while the form template is being used for data entry. By way of example, and not by way of limitation, an example of forms application 410 is the InfoPath™ software provided by Microsoft Corporation of Redmond, Wash.

While the XSD or schema is used to validate data at runtime, it can also be used to define bindings at design time (i.e., realizing a binding at runtime when the form template is being used for data entry). Leveraging this axiom, the schema or XSD for an original data source can be compared to a modification of the schema or XSD for the updated data source so as to detect the changes to the schema or XSD. Stated otherwise, for an original data source (DS) and a modification thereof (DS'), and respectively defined by and original schema (XSD) and a modified schema (XSD'), differences between XSD and XSD' are detected. As such, where DS is represented by tree t having nodes n, and where DS' is represented by tree t' having nodes n', the schema differences for between tree t and t' can be detected—such as is seen for the respective data sources in FIGS. 5a-5b. As used herein, attributes, attribute values, and text content are all nodes, and nodes are also referred to as elements.

When changes are detected to a schema or XSD, which indicates that modifications have been made to an original data source, one or more of five (5) different types of dependencies can be updated between the data source and a corresponding form template. A first dependency than can be updated occurs if the type or cardinality of an element or attribute has changed. An example of a cardinality change is where a node in data source is defined has having a sequence of five children nodes and the modified data source is detected as being redefined such that the sequence of five children nodes has been changed to a sequence of ten children nodes. Stated otherwise, an example of a cardinality change is where an original data source defines an element to occur once and in the updated data source it is allowed to occur 10 times. In this first dependency update, a revalidation is conducted for all bindings to the changed element or attribute. A second dependency than can be updated occurs if a qualified name of an element or an attribute has changed. By way of example, and not by way of limitation, a qualified name in XML can mean the combination of a local name and a name space, also known a as 'fully qualified name'. In this second dependency update, all of the bindings can be updated so as to use the new qualified name instead of the old qualified name. A third dependency than can be updated occurs if an element or an attribute has moved, where the element should include parent nodes (i.e., containers) and not only leaf-level nodes. In this third dependency update, all of the bindings (including markup language fragments, etc.) can be updated so as to use the new location of the element (and its descendents) or to use the new location of the attribute (and its descendents), and a revalidation can be conducted to all of the bindings to the element (and its descendents) or to the attribute (and its descendents). A fourth dependency that can be updated occurs if an element or attribute has been removed. In this fourth dependency update, all of the bindings can be removed that use the element (and its descendents) or that use the attribute (and its descendents), and an update is also made to all of the bindings to the ancestors of the renamed element or attribute. A fifth dependency than can be updated occurs if an element or attribute has been added. In this fifth dependency update, all of the bindings can be updated to the ancestors of the added element or to the ancestors of the added attribute.

When modifications have been made to an original data source to create a revised version thereof, one or more bindings between the original data source and one or more corresponding form templates should also be updated. By way of example, and not by way of limitation, the following bindings can be updated when an original data source has been detected as having been changed:
 (i) W3C XPath queries that bind the data source to editable components in a W3C XML Stylesheet Language Transform (XSLT) file;
 (ii) XML Documents and XML islands (i.e., XML embedded inside of another file) used for the initial state of the data source at edit time and for the initial state for pieces of the data source that are interactively added by a user during data entry by using a corresponding form template; and
 (iii) W3C XPath queries the define actions that can be taken on the data source such as calculations, data validation, editability, etc.

Methods, software, systems, and apparatus can be used to detect modifications between the two data sources (e.g., schema or XSD changes) and to cause the binding updates to occur. Stated otherwise, once changes have been detected to a schema for a data source, indicating that the data source has been modified, a summary of those changes is accumulated. For instance, if the data source is represented by a tree t having nodes n and the modified data source is represented by a tree t' having nodes n', then the summary of accumulated changes are applied to tree t to accomplish tree t' through the granular application of changes to each node $n_i$ to accomplish each node $n_i'$. These changes can include updates to dependencies such as rules for validating data entered into fields of the form template, rules for binding a data entry field to a corresponding field in the data source, business logic, the promotion of properties from a data entry field to other data entry fields, initial formatting of data in a data entry field, the moving of bindings in general, changes to a name or a namespace, changes to the cardinality of one of more nodes, changes to the type of one of more nodes, property promotions, etc. By way of example, and not by way of limitation, the transfer of the bindings can be made from each node $n_i$ to each node $n_i'$ by using function-specific event handlers. These function-specific event handlers accomplish the modification of the original data source according to changes that are detected in the schema that defines the new data source. As such, the change of the original data source into the new or modified data source is accompanied by accurate and precise changes to one or more corresponding form templates that are built on the same data source, or by accurate and precise changes to one or more different views within the same form template.

Figure 4:
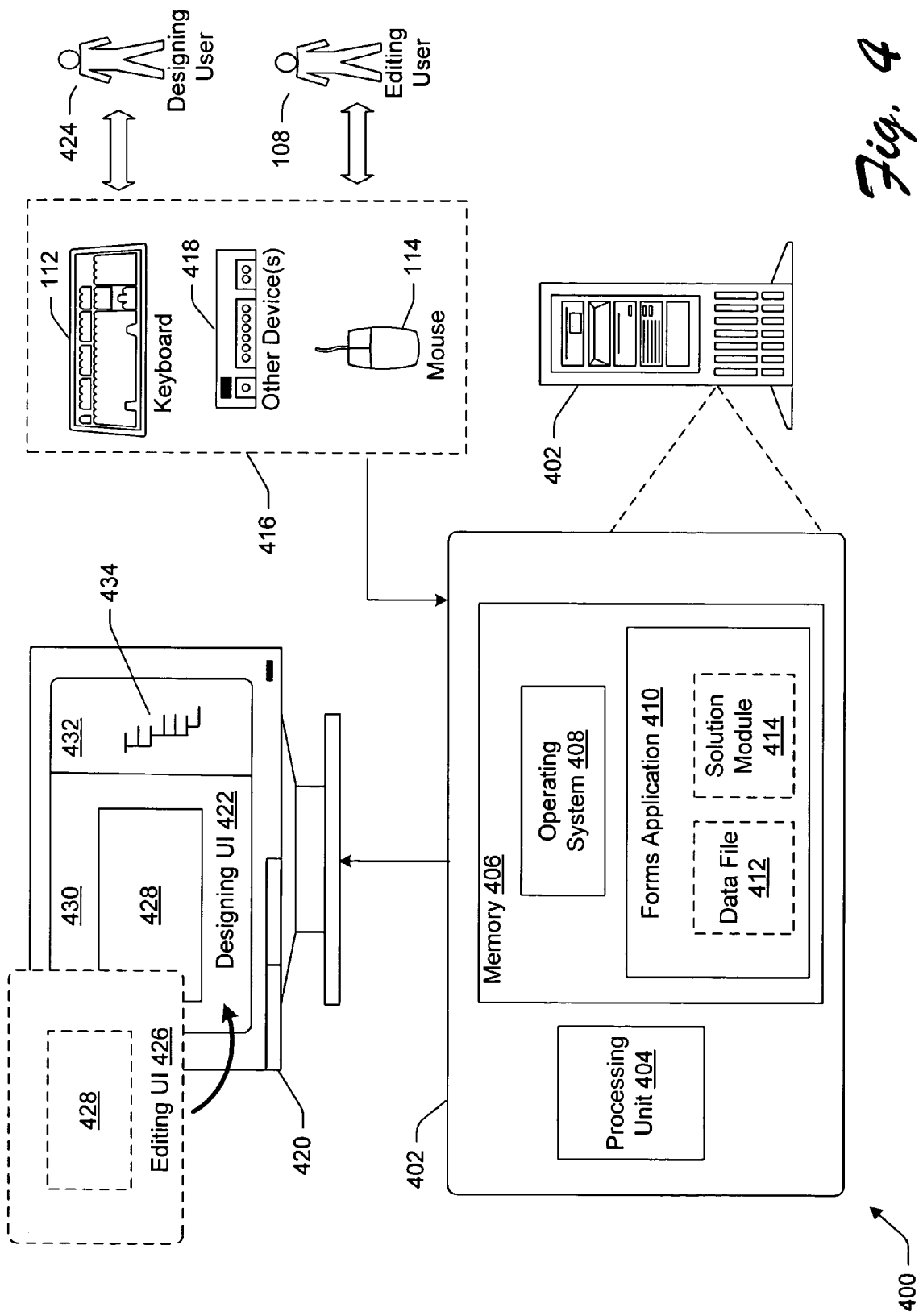
FIG. 4 shows an exemplary apparatus for implementing the execution of a forms application.

The present disclosure is relevant to the rendering and editing of information based on structured input data, such as a data source or a data tree. To provide a concrete framework for discussion, this disclosure describes the transformation of hierarchically organized data expressed in a markup language into an electronic form. The electronic form can be visually rendered and edited by an end user by use of an electronic forms application that can also be used to design the electronic form, such forms application 410 of FIG. 4. The concepts described herein, however, also have application to other data processing applications besides electronic forms processing.

This disclosure is organized as follows. Section A of this disclosure describes modifications to exemplary data sources for which dependencies are updated with respect to exemplary form templates so that accurate and precise mapping can be made by a forms application between the structured data of the modified data source and one or more corresponding visual surfaces. Section B describes an exemplary method of operation of the implementations described in Section A, and Section C describes an exemplary computing environment that can be used to provide the implementations described in Sections A and B.

A. Exemplary Data Source Modifications

Because hierarchically organized data that is expressed in a markup language can be transformed into an electronic form, such electronic forms are based on marked up data, for instance XML data. When modifying the electronic forms using editing controls (e.g., filling out the form or entering data into the form), the editing user is indirectly manipulating the underlying XML tree that will be persisted when the electronic form is saved. For instance, data entry that can be made into the electronic form can be repeating sections and optional sections, each of which is an editing control that is bound to XML data. When data is entered or deleted using an editing control on the electronic form, the underlying XML data is correspondingly inserted or deleted. The XML tree is also validated against a corresponding XSD schema whenever it is being modified.

The received data that is entered into the data-entry fields of the electronic form (e.g., 500a, 500b) by the editing user 108 must be valid in order to be associated with corresponding nodes in the XML document (e.g., 520a, 520b) in its relationship with the corresponding XML document 102 in accordance with the associated schema 204 (.xsd). Although not shown in FIGS. 5a-5b, but by way of further example, a data entry field that can be on the electronic form, and into which the editing user 108 can enter data, can include an editing control represented by one or more of the following: a plain text box, a drop-down list box, a list box, a check box, a rich text box, an expression box, an option button, a button, a section with controls, a section, an optional section, an optional section with controls, a repeating section with controls, a repeating section, controls in a layout table, controls, a repeating table, a bulleted list, a numbered list, a plain list, a hyperlink, a date picker, an inline picture, a linked picture, etc. Each editing control can be an Extensible Stylesheet Language (XSLT) component.

The structure of each control on the electronic form will correspond to a particular hierarchy of the data in a particular portion of the data source 520a, 520b. Thus, if the structure of the portion of hierarchical data in the data source 520a, 520b will allow for multiple fields of data, the forms application 410 will allow for entry in corresponding multiple data entry fields, such as editing controls that will allow for repeating sections and/or a repeating table. Likewise, if the structure of the portion of hierarchical data in the data source 520a, 520b will allow for storage of only textual data, the forms application 410 will allow for entry in a corresponding data entry field of just textual data.

FIG. 6a shows a data source 602a which can be represented as a tree t having a plurality of nodes $n_i$. The schema for data source 602a is to be modified so as to form a modified of data source, namely a data source 602b shown in FIG. 6b. Data source 602b can be represented as a tree t' having a plurality of nodes $n_j'$. A comparison of the data sources 602a, 602b will indicate that a plurality of nodes have been added on to the data source 602a to arrive at its modification seen in data source 602b.

Figure 7A:
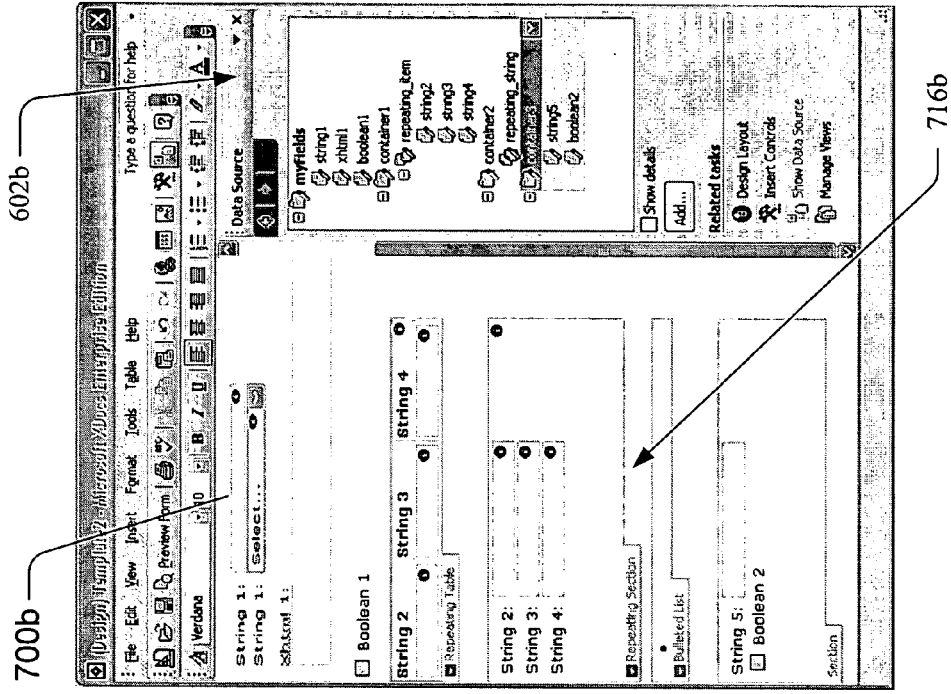
FIGS. 7*a*-7*b* depict exemplary user interfaces (UI) for revising and reviewing an original and an updated electronic form, which respectively correspond to the original and modified data sources depicted in FIGS. 6*a*-6*b*.
Figure 7B:
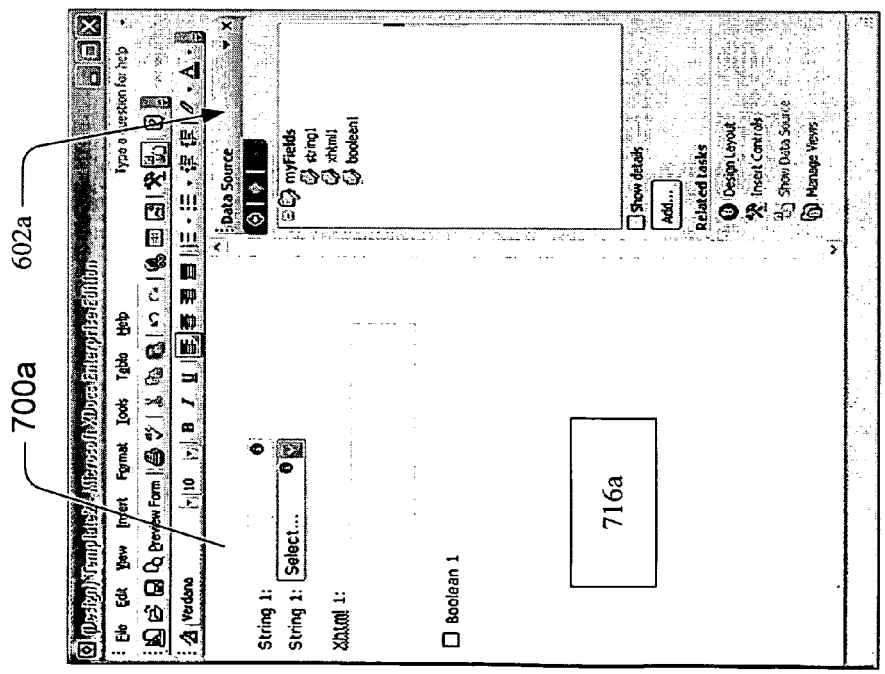

FIGS. 7a-7b depict one exemplary embodiment depicted by screen shots that are presented to illustrate an implementation in which an exemplary electronic form is being revised or reviewed by a designing user 424 using the designing UI 422 during execution of the forms application 410. The operations performed in this session include changing the data source and binding controls to the newly added nodes from the tree. FIGS. 7a-7b exhibit and correspond to the data source 602a and its modification 602b seen in FIGS. 6a-6b, respectively. Note that area 716a of FIG. 7a represents the portion of a visual presentation of the corresponding form template that is modified into portion 716b of FIG. 7b.

In one implementation, the designing UI 422 would be used by designing user 424 to specify both data source 602a and its modification, namely data source 602b. Alternatively, the designing user 424 could specify the respective schema for data sources 602a, 602b. Changes would then be detected and summarized between the respective schema for data sources 602a, 602b. These changes would then be processed, transparent to the designing user 424, so that dependencies would be updated between the piece 716a for the form template 700a corresponding to data source 602a and the piece 716b for the form template 700b corresponding to data source 602b. The update to the dependencies, while in most cases is straight forward, may require interaction by a forms designer, namely designing user 424. As such, and following the transparent update to the dependencies, the forms application 410 will display the designing UI 422 so that designing user 424 can interactively review and revise the resultant updated form template 700b.

In the foregoing implementation, the designing UI 422 could specify either original and revised data sources, or original and revised schema for a data source. The implementation can include a mechanism to determine the changes between the original and its revision. In one variation of the implementation, these changes could then be expressed as a sequence of primitive operations. A primitive operation is an elementary operation (e.g., add, multiply, etc.). Each primitive operation has one or more corresponding specific event handlers that are used to change the syntax description for a node $n_i$ of a tree t (e.g., schema for the node) into a syntax description for a node $n_j'$ of the tree t'. As many event handlers are created that are required for the primitive operations that need to be migrated for the bindings for each node $n_i$ to each node $n_j'$ Once the primitive operations had been determined, the sequence of primitive operations could then be executed, for instance, one at a time. As a consequence of executing each primitive operation, for each primitive operation, every time that a node n from an original data tree t is added, removed, renamed, moved, etc., with respect to a revised tree t', all of the dependencies on the effected node are updated, such as by an XPath operation. For instance, if a node is deleted, then all the bindings that were making a reference to that node are removed. If a node has been moved, all binding that were pointing to that node will be updated so as to point to the new position that the moved node is now in. If a node is renamed, then all of the bindings that were referring to that node are updated so that the bindings now refer to the new name of the renamed node. As a result, all the bindings for a first syntax description (e.g., schema) of a first data source will be migrated into a second data source in a congruous way because the event handlers were moved over for each primitive operation, such that the corresponding correlative bindings from the first syntax description for the first data source were moved over for the second data source. At the end of the operation, after all of the event handlers have been run with respect to a form template, the first data source is updated to the version of the second data source so as to be valid for an updated version of the original form template.

Figure 8B:
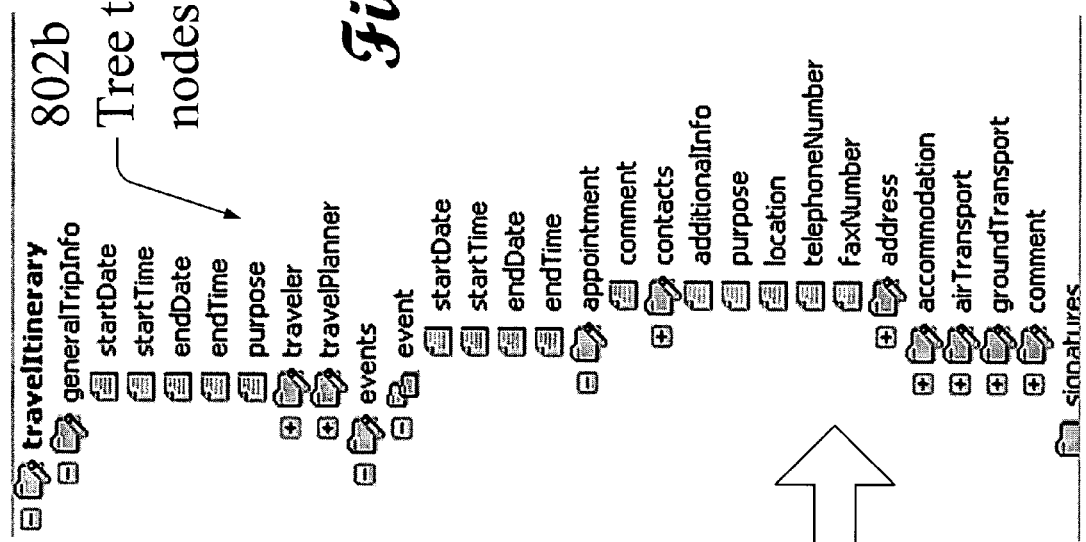
FIGS. 8*a*-8*a* depict an original data source and a modified data source, respectively.
Figure 8A:
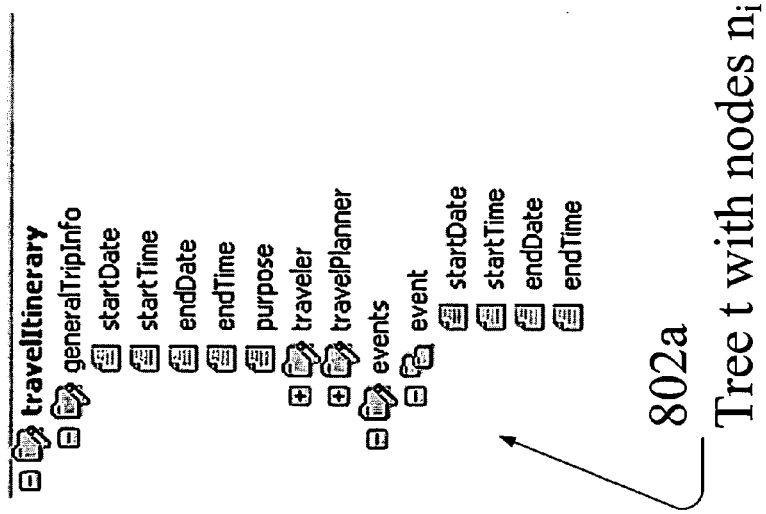

FIG. 8a shows a data source 802a which can be represented as a tree t having a plurality of nodes $n_i$. The schema for data source 802a is to be modified so as to form a modified of data source, namely a data source 802b shown in FIG. 8b. Data source 802b can be represented as a tree t' having a plurality of nodes n$_j$'. A comparison of the data sources 802a, 802b will indicate that a plurality of nodes have been added on to the data source 802a to arrive at its modification seen in data source 802b.

Figure 9A:
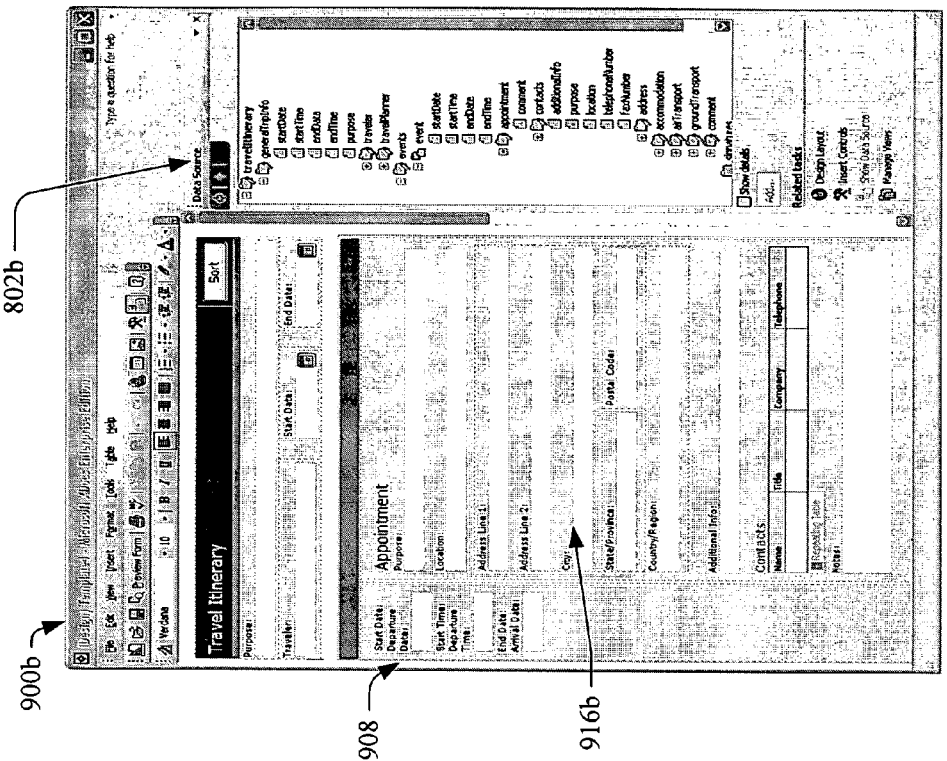
FIGS. 9*a*-9*b* depict exemplary user interfaces (UI) for revising and reviewing an original and an updated electronic form, which respectively correspond to the original and modified data sources depicted in FIGS. 8*a*-8*b*.
Figure 9B:
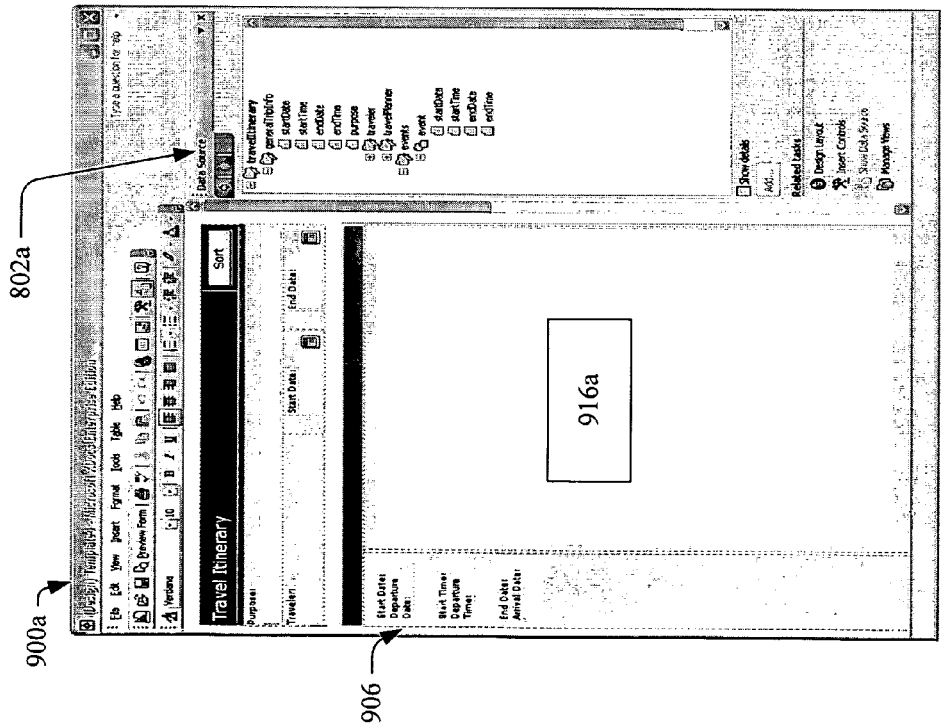

FIGS. 9a-9b depict exemplary screen shots that are presented to illustrate an implementation in which an exemplary electronic form is being revised or reviewed by a designing user 424 using the designing UI 422 during execution of the forms application 410. FIGS. 9a-9b exhibit and correspond to the data source 802a and its modification 802b seen in FIGS. 8a-8b, respectively. Note that area 916a of FIG. 9a represents the portion of a visual presentation of the corresponding form template that is modified into portion 916b of FIG. 9b.

In one implementation, the designing UI 422 would be used by designing user 424 to specify both data source 802a and its modification, namely data source 802b. Changes would then be detected and summarized between the respective schema for data sources 802a, 802b. These changes would then be made, transparent to designing user 424, so that dependencies would be updated between the piece 916a for the form template 906 corresponding to data source 802a and the piece 916b for the form template 908 corresponding to data source 802b. The update to the dependencies, while in most cases is straight forward, may require interaction by a forms designer, namely designing user 424. As such, and following the update to the dependencies, the forms application 410 will display the designing UI 422 so that designing user 424 can interactively review and revise the resultant updated form template 908.

In the foregoing implementation, forms application 410 can display the designing UI 422 to a designing user 424 who would input an original form template. The designing user 424 would also input an original data source and a modified version thereof, an original schema and a modified version thereof (e.g., two different syntax descriptions), or both. These alternative inputs are available as a starting point for the implementation because, to be a data source, a schema is needed because the data source can be inferred from the schema. The schema, for instance, can be provided by a standards body. Also, the designing user 424 could also (optionally) input original and modified versions of an XML instance (XML document), original and modified versions of a web service call/response (an WSDL), original and modified versions of an ADO connection to a database, original and modified versions of SQL server, and original and modified versions of access tables. From these, syntactic descriptions (e.g., schema) can be inferred. On the basis of either an inferred schema or a schema that is given, the original and modified versions of data sources can be created. Once the differences between the original and modified versions of schema have been determined, the forms application 410 would then determine the bindings, which are the parameters that are tied to instances that are described by the modified version of the syntax description. The form template corresponding to the original data source can also be provided. The forms application 410 would then determine the event handlers that are needed for the primitive operations in order to migrate each of the bindings. Then, a computation is made of the sequence of primitive operations that will transform the first syntactic description into the second syntactic description. For each of the primitive operations that is executed, one of more event handlers ('listeners' or entities of code) are run. The event handlers make the bindings transfer over from one node n$_i$ of the original data tree t to another node n$_j$' of the revised version of that data tree t'. The result is that the designing UI 422 displays a revision of the form template that is valid for the revised version of the data source (e.g., data tree t') and its schema. Here, for instance, different input fields could be on the revised version of the form template than were on the original form template.

B. Exemplary Method of Operation

An exemplary procedure is now described for changing a data source after a form template corresponding to the data source has been created. The exemplary procedure allows a structure of a form template to dynamically adapt to a data source change (e.g., schema change). The need for this procedure can arise, for instance, after a form designer has created a form template that is based on a web service or a database, where the form template is later required to be updated because the data structure for the web service or database has changed (e.g., adding a column to a table in the database). The exemplary procedure allows the form designer to avoid significantly reworking the originally designed form template.

Figure 2:
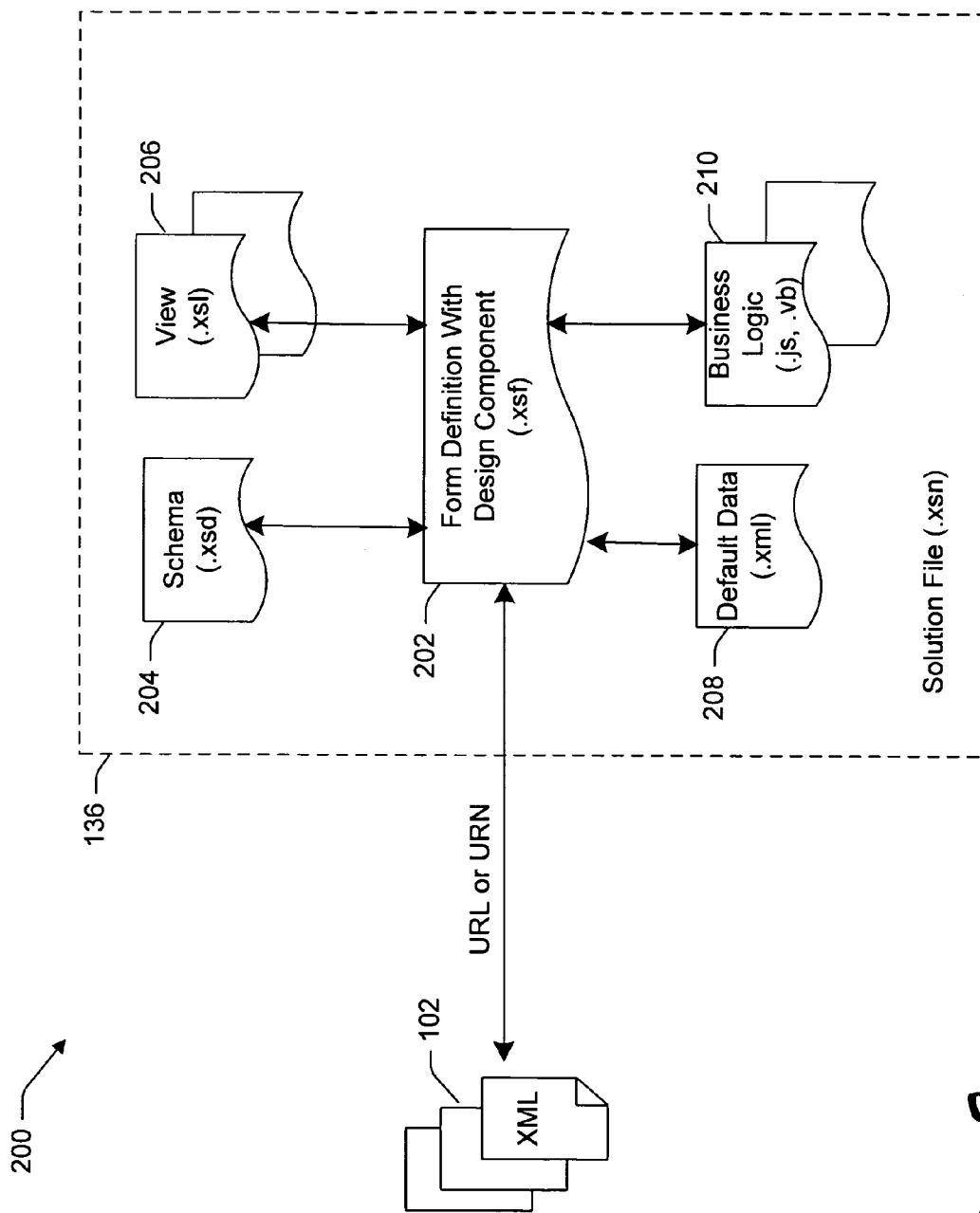
FIG. 2 shows an exemplary solution file used in conjunction with a solution module shown in FIG. 1.
Figure 3:
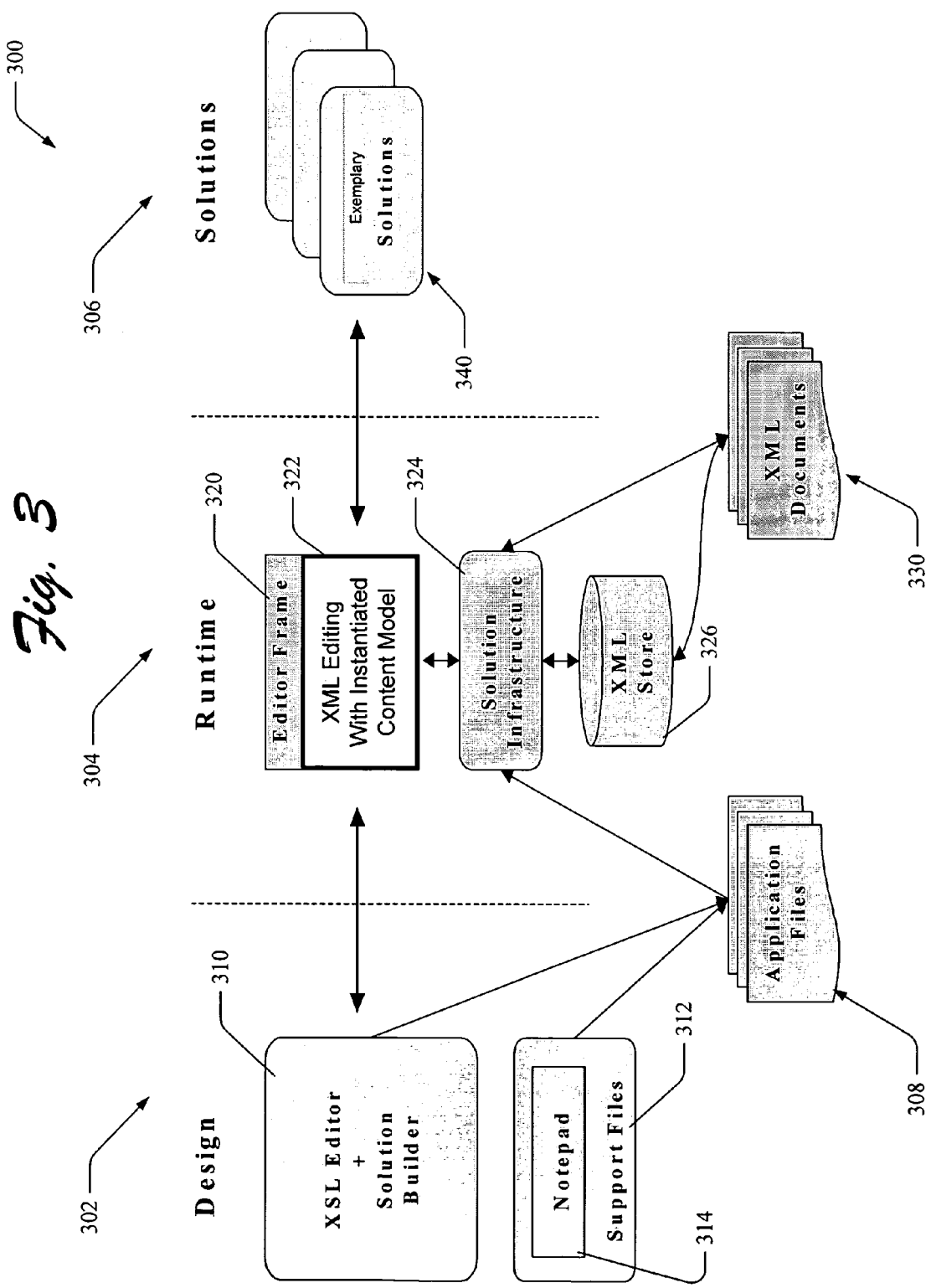
FIG. 3 is a flow diagram illustrating exemplary relationships between design components for an electronic form application, runtime components for using an electronic form designed using the design components, and solution components that are preexisting electronic forms that can be used with the electronic form application.

Given two data sources (DS1, DS2) and the two generalized instances calculated from them (G1, G2), a computation is made of the difference D there between, such that G1+D=G2 (note that, where a hierarchical tree is a visual representation of a data source, the DS is a generalized instance that is generated starting from a schema). The computation of the difference D can also be subsequently decomposed into elementary operations that can be transferred to the features bound to the nodes of DS2, such as are found in the forms definition 202 and the view 206 as seen in FIG. 2. To do so, certain primitive operations are needed to manipulate a rooted data tree. Given a data tree, any operation on the nodes of the data tree can be defined by combining any of four primitive operations: node addition, node insert, node rename and node deletion. These four primitives can be used to define node wrapping as a case of node insert and node move, whereas node unwrapping can be defined as a case of node move and node delete. Examples of these are as follows:

| Before | After |
|---|---|
| Node Addition | |
| <A><br>   <B><br></A> | <A><br>   <B><br>   <C><br></A> |
| Node Wrapping | |
| <A><br>   <B/><br></A> | <A><br>   <C><br>      <B/><br>   </C><br></A> |
| Node Unwrapping | |
| <A><br>   <C><br>      <B/><br>   </C><br></A> | <A><br>   <B/><br></A> |
| Node Deletion | |
| <A><br>   <C><br>      <B><br>   </C><br></A> | <A> |

Other than the above four primitive operations, there are additional operations that can be performed to revise or manipulate a data tree. For instance, when a schema for a data source has been discovered, there are other operations that can be performed on a tree node. These other operations include a namespace change, a data-type change, a model group change, and a cardinality change. Additionally, these other operations are independent from the primitive tree operations and the result of these transformations by performing these operations does not change the sequence of the primitive operations.

Transformation for the generalized instances G1, G2 can be defined as $$T(G1)=G2$$

$$T(G1)=\Sigma T\text{primitive}(G1)+\Sigma T\text{schema}(G1)$$

Elementary transformations to revise a data tree can be identified by identifying corresponding elementary operations. As stated above, an elementary operation is a primitive operation. Each primitive operation has one or more corresponding specific event handlers that are used to change the syntax description for a node $n_i$ of a tree t (e.g., schema for the node) into a syntax description for a node $n_j'$ of the tree t'. As many event handlers are created that are required for the primitive operations that need to be migrated for the bindings of each node $n_i$ to each node $n_j'$. Once the elementary operations are known, the forms application 410 can perform a corresponding specific event handler for each primitive operation. An example of this follows.

One specific event handler would be performed for each add primitive operation remaining in a sequence of elementary operations that was determined. One delete specific event handler would be performed for each delete primitive operation remaining in the sequence of elementary operations. One specific event handler would be performed for each rename primitive operation remaining in the sequence of elementary operations that was determined. One specific event handler would be performed for each move primitive operation remaining in the sequence of elementary operations that was determined. For each unwrap primitive operation remaining in the sequence of elementary operations, a sequence of moves and one delete would be made. For each wrap primitive operation remaining in the sequence of elementary operations, one add and a sequence of moves would be made. Changes in the schema that do not directly affect the tree structure of the generalized instance (e.g., data type change, cardinality change, model group change, namespace change) would result in the performance of a specific event handler of a type for a generalized instance property change.

Referring now to FIG. 2, the bindings that are updated for schema changes affecting a form template can be as follows:

In the form definition 202: property promotion, data validation, fragments of XML, XML to edit (data entry), calculations performed, other rules; and In the view 206: conditional formatting and control binding.

Figure 10:
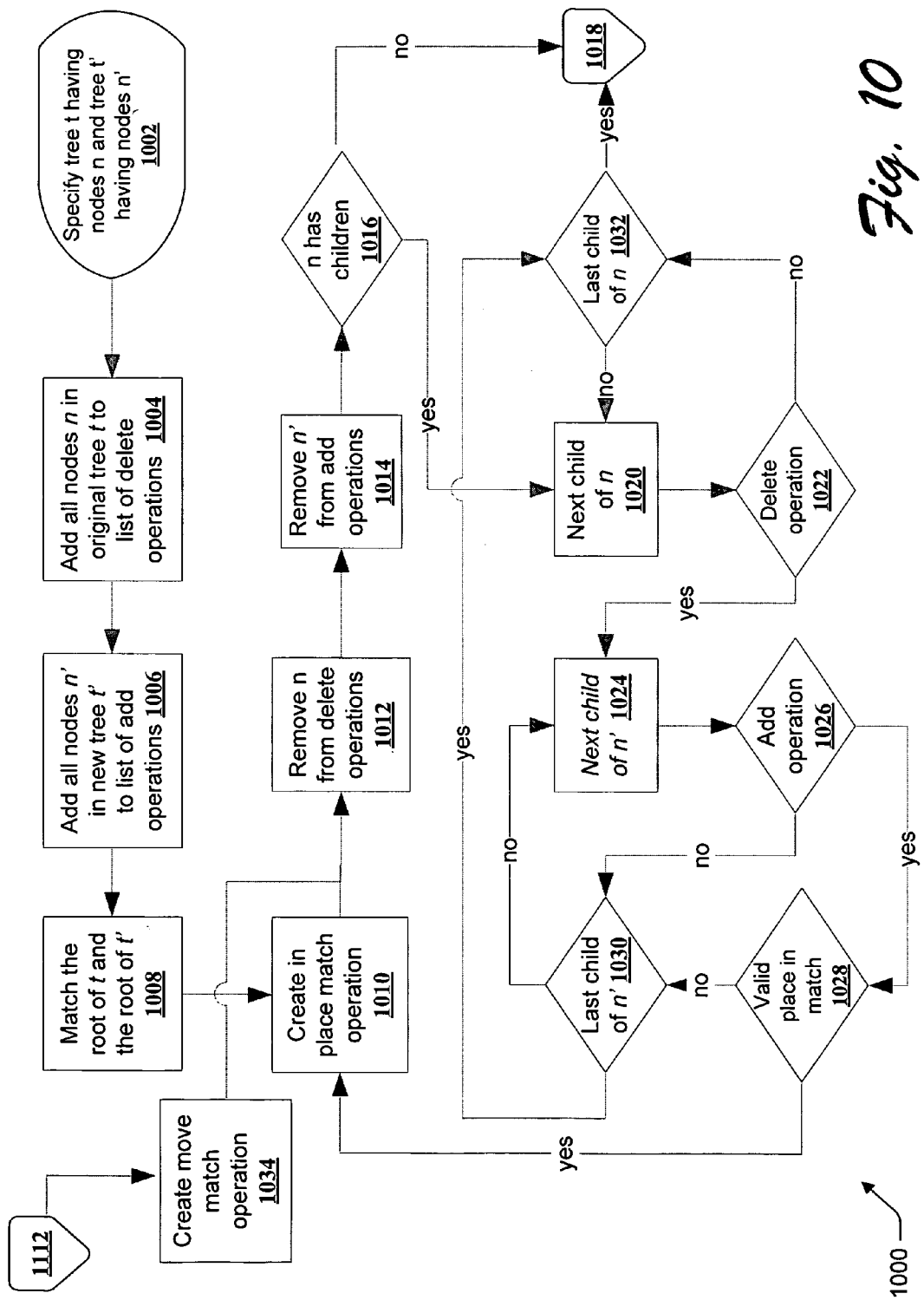
FIGS. 10-11 show an exemplary procedure for interactive specification of an original data source and modifications thereto, for detecting schema changes there between, for using the detected schema changes to make corresponding updates to dependencies in an associated form template, and for revising and/or reviewing the updated form template.
Figure 11:
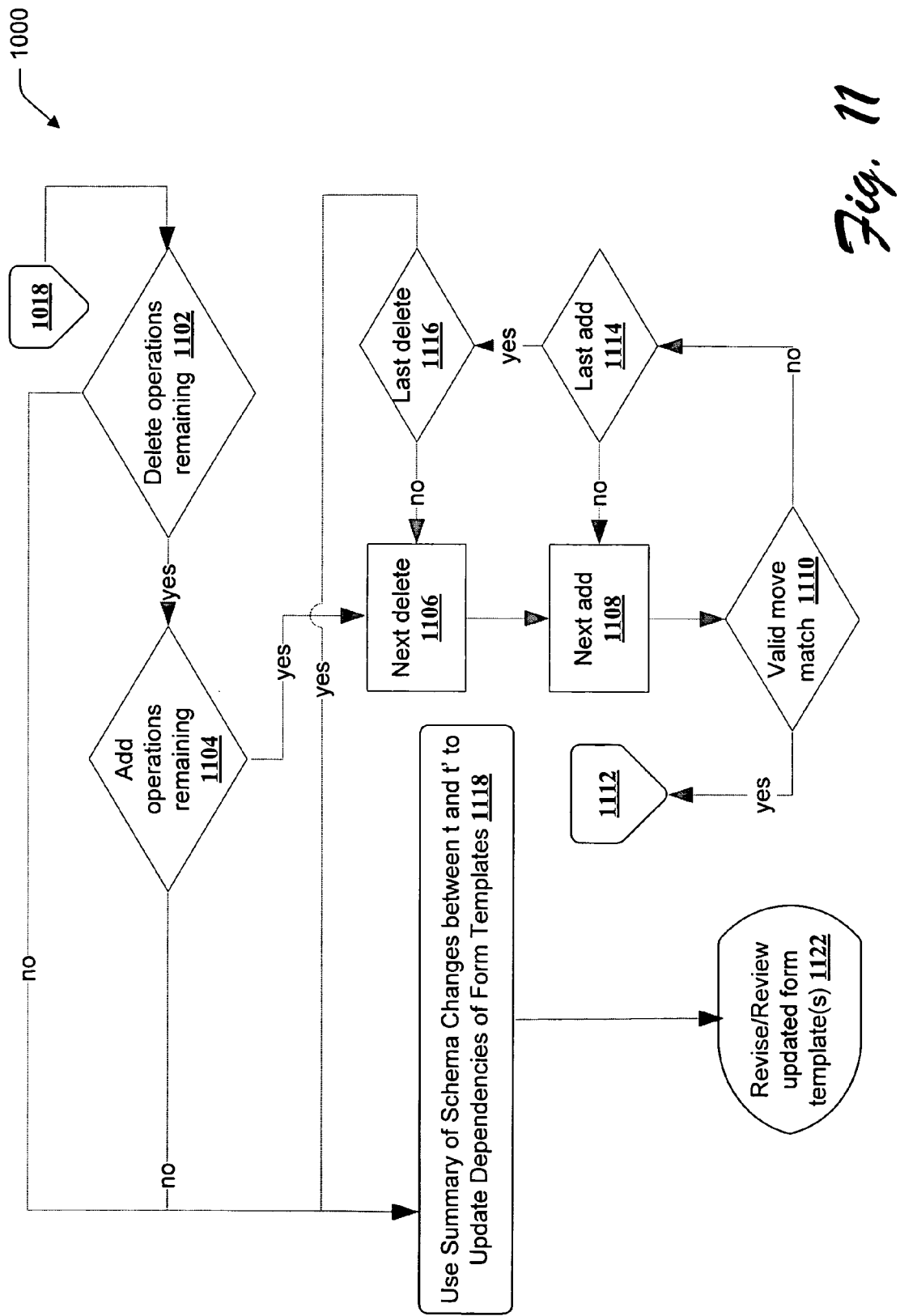

Another exemplary procedure 1000 is shown in FIGS. 10-11. Procedure 1000 is for changing from an old schema for a data source, expressed as a data tree t having nodes n, to a new schema for a new data source, expressed as a data tree t' having nodes n'. Procedure 1000 includes operations to transform data tree t into data tree t' by examining all of the nodes n in the data tree t and the nodes n' in the tree t' to determine there between any transforming operations that are needed. Once these transforming operations are determined, corresponding event handlers are used to move bindings over from each node n to each node n' for respective data trees t, t'. Upon determining and implementing the transformation operations via the event handlers, a revised form template can be produced that is valid for the revised data tree t' (e.g., the revised schema). The revised form template can be displayed for interactive review and revision by the designing user 424. The procedure 1000 can be implemented in software or firmware, or a combination of software and firmware.

Referring now to FIGS. 10-11 and other figures as are relevant, procedure 1000 begins with an interactive display 1002 that permits designing user 424 to specify a tree t having nodes n and a tree t' having nodes n' (or to specify a data source and a revision thereof). At block 1004 all nodes n in tree t are put on a list of delete operations to indicate that each node is to be deleted from tree t so that it will not be on the revised data tree t'. At block 1006 all nodes n' are put on a list of add operations to indicate that each node n' is to be added so as to be part of the revised tree t'. At block 1008, which is conducted only once in procedure 1000, the respective roots of data trees t and t' are matched. By way of example, in FIGS. 9a-9b, the root node "travelItinerary" in respect data sources 802a, 802b would be matched. The block 1008 requires that at least the roots must match between the two data trees t and t'. The matching of the roots can be determined from a markup language (e.g., XML) in which the schema for each data tree is defined. For instance, the markup language can specify that a node is a root, or a direct match can be found between a node n known to be the root for tree t and a node n' for tree t'. Alternatively, the two roots can be located by finding that two nodes in the highest level of each tree t, t' have the same name. Once the roots are matched, anything that is bound to the root of data tree t for a corresponding data source will be bound to the root of the data tree t' for a revised version of the data source. Of course, other criteria for matching could also be used, including finding nodes having the same name, finding respective nodes n, n' that have children nodes that are similar to each other, etc. Matches between each node n and each node n' can be express graphically, such as by an arrow going from each node n in data tree t to each node n' in data tree t', where an 'X' can be used to denote a deleted node in the revised version of data tree t and an "+" can be used to denote an added node in the revision of the data tree t.

After the roots have been matched at block 1008, procedure 1000 moves to block 1010 where an 'in place match' operation is created. An in place match operation is created when there has been no change in the parent of a node (e.g., the parent node of a node n from data tree t has the same parent node as a node n' from data tree t'). An in place match can be depicted by using an arrow from one node in one tree to another node in another tree. Stated otherwise, an in-place match occurs when nodes n and n' have the same parent node and the node n will not be moved by revisions to the syntactic description (e.g., the schema for the original data source, where the data for a form template will always have one data source described by the schema).

By way of example of an in place match, when there is a data field in a form template that is below an expense item field in the form template and the date field and expense item field are both in an original data source, and when a matching operation finds that there is also a date field under an expense item field in a revised version of the data source, an in place match can be found. This 'in-place' match means that the date field has not moved containers, that the parent node of the node corresponding to the date field is not different in the revised data source, there has been no change in the parent node, and the node corresponding to the date field is in similar parts of both the original and revised data sources. As such, an 'in place match' is a sort of rename operation where only the local name is changed. In an 'in place match', the parent nodes of respective nodes in the original and revised data sources are the same—which can be determined by an examination of the schema (e.g., which can be expressed in the XML) which reveals a notation from which it can be concluded that the parents are the same. The in-place match can be accompanied by any of several changes from a node n to a node n', including but not limited to a local name change, a namespace change, and a cardinality change—where the node n in data tree t has a number of children nodes that is different from the number of children nodes that n' in data tree t' has. A type change can also be present in an in-place match (e.g., a change from a text string node n to a date-time node n'). Another kind of change in an in-place match that is possible is a property change.

When an in-place match has been found, a flag can be set for each of the changes that are found. Ultimately, each flag represents a change that needs an specific function event handler to implement such that changes are made to data tree t so as to apply the differences so as to change data tree t to make the new data tree, t'. In one implementation, all bindings are found for changing data tree t having nodes n into data tree t' having nodes n'. The differences that have been found between trees t and t' are then applied to each node n.

Returning to procedure 1000 at block 1012, after the finding of an in-place match at block 1010, the node n is removed from the list of delete operations because its in place match was found as node n' in tree t'. Also, at block 1014 the node n' is removed from the list of add operations. Note that, since every node n of original data tree t was put on a list for a delete operation at block 1004 and every node n' from tree t' was put on the list for an add operation at block 1006, and since the node n had a node n' for which an in place match had been found, then the node n' should remain in the data tree t'. In the first loop through procedure 1000, nodes n and n' are the roots of respective data trees t and t'.

A query 1016 determines whether node n has any children nodes. Where an in place match had been found at block 1010 between node n and node n', it is guaranteed that the parent nodes n and n' are same and procedure 1000 can proceed to go through the children nodes of n and n' to see if in place matches can be found between the respective children nodes of n and n'.

If query 1016 determines that node n has one or more children nodes, procedure 1000 moves to block 1020 at which the next child of node n is examined. A query 1022 determines whether the child node of the node n being examined is on the list of delete operations (e.g., is the child of the current node n being examined subject to be being deleted from the original data source, or stated otherwise, is this child node still in the default state of its being subject to a 'delete' operation?)

At block 1024, the query 1022 was in the affirmative and the next child of the node n' in the data tree t' is examined. A query 1226 determines whether the child node of the node n' being examined is on the list of add operations (e.g., is the child node of the node n' being examined still in the default state of that node being subject to an 'add' operation?). At query 1028, the query 1026 was in the affirmative and a determination is there made as to whether there is a valid in place match for the node n' in data tree t' and another node n in data tree t. If such an in place match is found, then the procedure 1000 returns to block 1010. Otherwise, procedure 1000 moves to a query 1030 to determine if there are any more children of the node n' in data tree t' that is being examined. If there are no more children of node n', the procedure 1000 moves to query 1032 to determine if there are any more children of the node n in data tree t that is being examined. If there are no more children of node n, the procedure 1000 moves to connector 1018.

If query 1030 finds that there are more children nodes of the node n' in data tree t' that is being examined, the procedure 1000 moves to back to block 1024 to repeat its process as described above. If query 1032 finds that there are more children nodes of the node n in data tree t that is being examined, the procedure 1000 moves to back to block 1020 to repeat its process as described above.

FIG. 11 shows connector 1018 which is a continuation from FIG. 10. Procedure 1000 moves to a query 1102 from connector 1018 at which it is determined whether there are any remaining 'delete operations' that were originally put on the list of delete operations at block 1004. If not, the procedure 1000 moves to block 1118. Otherwise, procedure 1000 moves to a query 1104 at which it is determined whether there are any remaining 'add operations' that were originally put on the list of add operations at block 1006. If not, the procedure 1000 moves to block 1118. Otherwise, procedure 1000 moves to block 1106.

At block 1106 the list of delete operations created at block 1004 is examined to find the next remaining delete operation to be performed on a node n and to delete that node n that is found. Procedure 1000 then moves to block 1108 at which the list of add operations created at block 1006 is examined to find the next remaining add operation to be performed on a node n' and to add that node n' that is found. Procedure 1000 then moves to a query 1110 at which a determination is made as to whether a "move match" can be found, as explained below. If not, the procedure 1000 moves to a query 1114 to determine if there are any more add operations remaining to be performed on the list of add operations. If there are still more addition operations to be performed, the procedure 1000 moves to block 1108 to repeat the process for block 1108 described above. Otherwise, procedure 1000 moves to a query 1116 to determine if there are any more delete operations remaining to be performed on the list of delete operations. If there are still more delete operations to be performed, the procedure 1000 moves to block 1118. Otherwise, procedure 1000 moves to back to block 1106 to repeat the process for block 1106 described above.

A valid move match, as found at query 1110, means that the 'local name' of a node n being examined in data tree t is the same as the local name of a node n' being examined in data tree t'. For instance, a valid move match can be found for a data field node under an expense item node where the date field node has been the subject of a global change of its parent node (e.g., the expense item node) but the parent node has not changed its name space. As such, a move of the node n in data tree t occurs when the corresponding node n' in data tree t' and node n do not have matching parent nodes. Stated otherwise, if the respective parent nodes of two nodes being compared are different (e.g., the parent nodes do not match), then a move operation is needed. When a valid move match is found at query 1110, procedure 1000 moves to connector 1112 which returns to FIG. 10. Referring back to FIG. 10, connector 1112 proceeds to block 1034 where a move match operation is created. Procedure 1000 then moves back to block 1012 to repeat the process for block 1012 described above.

Reference is again made to FIG. 11. At block 1118, the changes that need to be made to data tree t having nodes n in order to form data tree t' having nodes n' are performed in order to update all of the dependencies for a form template that originally corresponded to the data tree t. Stated otherwise, block 1118 performs the operations that have to be done to a data source to make its revised version. As such, the changes there were detected between data tree t having nodes n and data tree t' having nodes n' are applied as respective notify operations. Each notify operation is a function of each specific event handler that changes each node n of data tree t, where applicable, to one or more corresponding nodes n' in data tree t'. These changes to data tree t are used to create a revised form template that is valid for data tree t' having nodes n', where the revised form template can be presented to a designing user 424 for review and further revision. This implementation applies event handlers only after all changes to a data source have been found, where the original data tree t is revised according to differences found with respect to data tree t' after all those differences have been found. The application of event handlers, however, could also be performed as each difference is found rather than by applying all event handlers at one time. In applying the event handlers so as to change each node n of data tree t, where applicable, into one or more nodes n' in data tree t', the bindings that are moved correspond to changes to the namespace, the cardinality, the type, the name, property promotion, etc.

The result of procedure 1000 is a revised form template that corresponds to the revised data tree t' having nodes n'. Procedure 1000 can be configured so that there will be as few 'delete' operations and as few 'add' operations as possible, where procedure 1000 maximizes the number of in place and move matches that can be found. This configuration of procedure 1000 is predicated upon the efficiency that the more matches that are found, the less bindings that might be performed incorrectly when there is a schema change affecting a form template, as has been described above. The less bindings that are used, the less revision work that will be required of the designing user 424 to revising the resultant form template that is created so as to be valid for the data tree t' having nodes n'.

C. Exemplary Computer Environment

FIG. 12 illustrates one example of a computing environment 1200 within which the above-described forms application 410 can be either fully or partially implemented. The computing environment 1200 includes the general purpose computer 1202 and display device 1220 discussed in the context of FIG. 12. However, the computing environment 1200 can include other kinds of computer and network architectures. For example, although not shown, the computer environment 1200 can include hand-held or laptop devices, set top boxes, programmable consumer electronics, mainframe computers, gaming consoles, etc. Further, FIG. 12 shows elements of the computer environment 1200 grouped together to facilitate discussion. However, the computing environment 1200 can employ a distributed processing configuration. In a distributed computing environment, computing resources can be physically dispersed throughout the environment.

Exemplary computer 1202 includes one or more processors or processing units 1204, a system memory 1206, and a bus 1208. The bus 1208 connects various system components together. For instance, the bus 1208 connects the processor 1204 to the system memory 1206. The bus 1208 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1202 can also include a variety of computer readable media, including a variety of types of volatile and non-volatile media, each of which can be removable or non-removable. For example, system memory 1206 includes computer readable media in the form of volatile memory, such as random access memory (RAM) 1210, and non-volatile memory, such as read only memory (ROM) 1212. ROM 1212 includes an input/output system (BIOS) 1214 that contains the basic routines that help to transfer information between elements within computer 1202, such as during start-up. RAM 1210 typically contains data and/or program modules in a form that can be quickly accessed by processing unit 1204.

Other kinds of computer storage media include a hard disk drive 1216 for reading from and writing to a non-removable, non-volatile magnetic media, a magnetic disk drive 1218 for reading from and writing to a removable, non-volatile magnetic disk 1220 (e.g., a "floppy disk"), and an optical disk drive 1222 for reading from and/or writing to a removable, non-volatile optical disk 1224 such as a CD-ROM, DVD-ROM, or other optical media. The hard disk drive 1216, magnetic disk drive 1218, and optical disk drive 1222 are each connected to the system bus 1208 by one or more data media interfaces 1226. Alternatively, the hard disk drive 1216, magnetic disk drive 1218, and optical disk drive 1222 can be connected to the system bus 1208 by a SCSI interface (not shown), or other coupling mechanism. Although not shown, the computer 1202 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1202. For instance, the readable media can store an operating system 1228, one or more application programs 1230 (such as the forms application 410), other program modules 1232, and program data 1234.

The computer environment 1200 can include a variety of input devices. For instance, the computer environment 1200 includes the keyboard 112 and a pointing device 114 (e.g., a "mouse") for entering commands and information into computer 1202. The computer environment 1200 can include other input devices (not illustrated), such as a microphone, joystick, game pad, satellite dish, serial port, scanner, card reading devices, digital or video camera, etc. Input/output interfaces 1236 couple the input devices to the processing unit 1204. More generally, input devices can be coupled to the computer 1202 through any kind of interface and bus structures, such as a parallel port, serial port, game port, universal serial bus (USB) port, etc.

The computer environment 1200 also includes the display device 1238. A video adapter 1240 couples the display device 1238 to the bus 1208. In addition to the display device 1238, the computer environment 1200 can include other output peripheral devices, such as speakers (not shown), a printer (not shown), etc.

Computer 1202 can operate in a networked environment using logical connections to one or more remote computers, such as a remote computing device 1242. The remote computing device 1242 can comprise any kind of computer equipment, including a general purpose personal computer, portable computer, a server, a router, a network computer, a peer device or other common network node, etc. Remote computing device 1242 can include all of the features discussed above with respect to computer 1202, or some subset thereof.

Any type of network can be used to couple the computer 1202 with remote computing device 1242, such as a local area network (LAN) 1244, or a wide area network (WAN) 1246 (such as the Internet). When implemented in a LAN networking environment, the computer 1202 connects to local area network 1244 via a network interface or adapter 1248. When implemented in a WAN networking environment, the computer 1202 can connect to the WAN 1246 via a modem 1250 or other connection strategy. The modem 1250 can be located internal or external to computer 1202, and can be connected to the bus 1208 via serial I/O interfaces 1252 other appropriate coupling mechanism. Although not illustrated, the computing environment 1200 can provide wireless communication functionality for connecting computer 1202 with remote computing device 1242 (e.g., via modulated radio signals, modulated infrared signals, etc.).

In a networked environment, the computer 1202 can draw from program modules stored in a remote memory storage device 1254. Generally, the depiction of program modules as discrete blocks in FIG. 12 serves only to facilitate discussion; in actuality, the programs modules can be distributed over the computing environment 1200, and this distribution can change in a dynamic fashion as the modules are executed by the processing unit 1204. Wherever physically stored, one or more memory modules, such as system memory 1206, non-volatile magnetic disk 1220, non-volatile optical disk 1224 and remote memory storage 1254, can be provided to store the forms application 410 programming code.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. For a first data source having a plurality of nodes each corresponding to a respective piece of a form template, wherein each said piece of the form template has one or more dependencies to the corresponding node of the first data source, and wherein a second data source has a plurality of nodes, a method comprising:
   finding differences between the first and second data sources; and
   using the differences to:
      update the dependencies of each said piece of the form template to each said nodes of the first data; and
      output another version of the form template having the updated dependencies; and
   wherein each said dependency of each said piece of the form template to the corresponding node of the first data source is selected from the group consisting of a binding, a validation of data, and a combination thereof;
   wherein the differences between the first and second data sources are determined by comparing each said node in the first data source with a corresponding said node in the second data source; and
   each said comparison finds a difference selected from the group consisting of:
      types of the respective nodes are different;
      cardinalities of the respective nodes are different;
      qualified names of the respective nodes are different;
      the node of the first data source is being moved;
      the node of the first data source is being removed and the node of the second data source is being added; and
      the node of the second data source is being added.

2. The method as defined in claim 1, wherein:
   each of the first and second data sources are inferred from a respective markup-language schema; and
   portions of the each of the first and second data sources are logically coupled with fragments of the respective markup-language schema.

3. The method as defined in claim 1, wherein each of the first and second data sources are selected from the group consisting of:
   a markup language document;
   an XML document;
   a schema definition file;
   a schema definition file for an XML document;
   a web service definition language (WSDL) for a web service;
   a table for a server application; and
   a table for a database application.

4. The method as defined in claim 1, wherein when the comparison finds that the difference is the cardinality, validating the node of the first data source in accordance with a validation of the node of the second data source.

5. The method as defined in claim 1, wherein when the comparison finds that the difference is the type, updating one or more bindings of the node of the first data source to use a qualified name of the node of the second data source in place of a qualified name of the node of the first data source.

6. The method as defined in claim 1, wherein when the comparison finds that the difference is that the node of the first data source is being moved:
   updating one or more bindings of the node of the first data source, and any children nodes thereof, to use a location of the node of the second data source; and
   validating the one or more bindings for the node of the first data source, and any child node thereof, in accordance with a validation of the node of the second data source.

7. The method as defined in claim 1, wherein when the comparison finds that the difference is that the node of the first data source is being removed and the node of the second data source is being added:
   removing one or more bindings of the node of the first data source, and any child node thereof; and
   updating the one or more bindings for the node of the first data source, and any child node thereof, in accordance with one or more bindings of the node of the second data source.

8. The method as defined in claim 1, wherein when the comparison finds that the difference is that the node of the second data source is being added:
   updating one or more bindings for the node of the second data source, and any child node thereof, for a dependency of a respective said piece of the form template to the node of the second data source.

9. The method as defined in claim 1, wherein each said binding is selected from the group consisting of:

an XPath query that binds the first data source to editable components in an XML Stylesheet Language Transform (XSLT) file;

an XML code that defines an initial or default state of the first data source, or pieces thereof; and an XPath query that defines actions including calculations, data validation, and editability which are performable on the first data source.

10. A computer readable medium having machine readable instructions that, when executed by a computer, performs the method of claim 1.

11. A computer readable medium comprising a machine readable instructions that, when executed by a computer, perform a method that uses a first data source having first nodes and being represented by a first schema, and the uses a second data source having second nodes and being represented by a second schema, wherein:

each of the first and second schema defines validation of data;

the first schema defines:
data entry fields in a form template each respectively corresponding to one or more of the first nodes of the first data source; and a biding between each said data entry field in the form template and each said first node; and the method comprises:
comparing, for respective said first and second nodes, the first and second schema to find a difference there between; and using the difference to update the binding between each said data entry field in the form template and each said first node; and wherein the difference is selected from the group consisting of:
type of the first node is changed by the second node;
cardinality of the first node is changed by the second node;
qualified name of the first node is changed by the second node;
the first node is being moved;
the first node is being removed and the second node is being added; and
the second node is being added.

12. The computer readable medium as defined in claim 11, wherein each of the first and second data sources are selected from the group consisting of:
a markup language document;
an XML document;
a schema definition file;
a schema definition file for an XML document;
a web service definition language (WSDL) for a web service;
a table for a server application; and
a table for a database application.

13. The computer readable medium as defined in claim 11, wherein when the difference is the cardinality, validating the first node in accordance with a validation of the second node.

14. The computer readable medium as defined in claim 11, wherein when the difference is type, updating one or more bindings of the first node to use a qualified name of the second node in place of a qualified name of the first node.

15. The computer readable medium as defined in claim 11, wherein when the difference is that the first node is being moved:

updating one or more bindings of the first node, and any child node thereof, to use a location of the second node; and validating the one or more bindings for the first node, and any child node thereof, in accordance with a validation of the second node.

16. The computer readable medium as defined in claim 11, wherein when the difference is that the first node is being removed and the second node is being added:

removing one or more bindings of the first node, and any child node thereof; and updating the bindings for the first node, and any child node thereof, in accordance with a binding of the second node.

17. The computer readable medium as defined in claim 11, wherein when the difference is that the second node is being added:

updating one or more bindings for the second node, and any child node thereof, with respect to one or more corresponding said data entry fields in the form template.

18. The computer readable medium as defined in claim 11, wherein each said binding is selected from the group consisting of:

an XPath query using editable components in an XML Stylesheet Language Transform (XSLT) file;

an XML code that defines an initial or default state of the first data source, or pieces thereof; and an XPath query that defines calculations, data validation, and editability.

19. A computer readable medium comprising machine readable instructions that, when executed by a computer, perform a method that uses first and second structured markup language documents, each having a syntax described by a schema and having a plurality of markup language nodes that are arranged in a hierarchical structure of parents nodes having children nodes such that the hierarchical position of each said markup language node in the hierarchical structure is expressed as a corresponding fragment of the markup language, wherein a form template has a plurality of data entry fields, each corresponding to and having dependencies to one or more of the markup language nodes of the first structured markup language document, and wherein the method comprises:

finding differences between the respective schema of the first and second structured markup language documents; and using the differences to update the dependencies of each said data entry field of the form template to the corresponding said one or more nodes of the first structured markup language document; and wherein:

the differences between the respective schema of the first and second structured markup language documents are determined by comparing each said node in the first structured markup language document with a corresponding said node in the second structure markup language document; and at least one comparison finds a difference selected from the group consisting of:
types of the respective nodes are different;
cardinalities of the respective nodes are different;
qualified names of the respective nodes are different;
the node of the first structured markup language document is being moved;

the node of the first structured markup language document is being removed and the node of the second structured markup language document is being added; and the node of the second structured markup language document is being added.

20. The computer readable medium as defined in claim 19, wherein each of the first and second structured markup language documents are inferred from their respective schema.

21. The computer readable medium as defined in claim 19, wherein:
each of the first and second structured markup language documents is written in XML;
the form template is written in XHTML; and
each said data entry field on the form template is an editing control that is an XSLT component.

22. The computer readable medium as defined in claim 19, wherein each of the first and second structured markup language documents are selected from the group consisting of:
a web service definition language (WSDL) for a web service;
a table for a server application; and
a table for a database application.

23. The computer readable medium as defined in claim 19, wherein each said dependency of each said data entry field of the form template to the corresponding said one or more nodes of the first structured markup language document is selected from the group consisting of a binding, a validation of data, and a combination thereof.

24. The computer readable medium as defined in claim 23, wherein when the comparison finds that the difference is the cardinality, validating the node of the first structured markup language document in accordance with a validation of the node of the second structured markup language document.

25. The computer readable medium as defined in claim 23, wherein when the comparison finds that the difference is the type, updating one or more bindings of the node of the first structured markup language document to use a qualified name of the node of the second structured markup language document in place of a qualified name of the node of the first structured markup language document.

26. The computer readable medium as defined in claim 23, wherein when the comparison finds that the difference is that the node of the first structured markup language document is being moved:
updating one or more bindings of the node of the first structured markup language document, and any child node thereof, to use a location of the node of the second structured markup language document; and
validating the one or more bindings for the node of the first structured markup language document, and any child node thereof, in accordance with a validation of the node of the second structured markup language document.

27. The computer readable medium as defined in claim 23, wherein when the comparison finds that the difference is that the node of the first structured markup language document is being removed and the node of the second structured markup language document is being added:
removing one or more bindings of the node of the first structured markup language document, and any child node thereof; and
updating the one or more bindings for the node of the first structured markup language document, and any child nodes thereof, in accordance with one or more bindings of the node of the second structured markup language document.

28. The computer readable medium as defined in claim 23, wherein when the comparison finds that the difference is that the node of the second structured markup language document is being added:
updating one or more bindings for the node of the second structured markup language document, and any child nodes thereof, for a dependency of a respective said data entry field of the form template to the node of the second structured markup language document.

29. The computer readable medium as defined in claim 23, wherein each said binding is selected from the group consisting of:
an XPath query that binds the first structured markup language document to editable components in an XML Stylesheet Language Transform (XSLT) file;
an XML code that defines an initial or default state of the first structured markup language document, or pieces thereof; and
an XPath query that defines actions which are performable on the first structured markup language document, including calculations, data validation, and editability.

30. An apparatus comprising:
storage for a form template having data entry fields and for first and second data sources respectively having first and second nodes and being respectively represented by first and second schema, wherein:
the first and second schema defined validation of data for the first and second nodes;
the first schema defines:
the data entry fields in the form template, each of which respectively corresponds to one or more first nodes of the first data source; and
a binding between each said data entry field in the form template and each said first node; and
one or more processors, coupled to the storage, to perform the acts of:
comparing, for respective said first and second nodes, the first and second schema to find a difference there between; and
using the difference to update the binding between each said data entry field in the form template and each said first node; and
wherein the difference is selected from the group consisting of:
type of the first node is changed by the second node;
cardinality of the first node is changed by the second node;
qualified name of the first node is changed by the second node;
the first node is being moved;
the first node is being removed and the second node is being added; and
the second node is being added.

31. The apparatus as defined in claim 30, wherein each of the first and second data sources are selected from the group consisting of:
a markup language document;
an XML document;
a schema definition file;
a schema definition file for an XML document;
a web service definition language (WSDL) for a web service;
a table for a server application; and
a table for a database application.

32. The apparatus as defined in claim 30, wherein when the difference is the cardinality, validating the first node in accordance with a validation of the second node.

33. The apparatus as defined in claim 30, wherein when the difference is the type, updating one or more bindings of the first node to use a qualified name of the second node in place of a qualified name of the first node.

34. The apparatus as defined in claim 30, wherein when the difference is that the first node is being moved:
  updating one or more bindings of the first node, and any child node thereof, to use a location of the second node; and
  validating the one or more bindings for the first node, and any child node thereof, in accordance with a validation of the second node.

35. The apparatus as defined in claim 30, wherein when the difference is that the first node is being removed and the second node is being added:
  removing one or more bindings of the first node, and any child node thereof; and
  updating the one or more bindings for the first node, and any child node thereof, in accordance with one or more bindings of the second node.

36. The apparatus as defined in claim 30, wherein when the difference is that the second node being is added:
  updating one or more bindings for the second node, and any child node thereof, with respect to one or more corresponding said data entry fields in the form template.

37. The apparatus as defined in claim 30, wherein each said binding is selected from the group consisting of:
  an Xpath query using editable components in an XML Stylesheet Language Transform (XSLT) file;
  an XML code that defines an initial or default state of the first data source, or pieces thereof; and
  an Xpath query that defines calculations, data validation, and editability.

* * * * *